(12) United States Patent
Sawyers et al.

(10) Patent No.: US 7,526,659 B2
(45) Date of Patent: Apr. 28, 2009

(54) SYSTEMS AND METHODS FOR CONTROLLING USE OF POWER IN A COMPUTER SYSTEM

(75) Inventors: Thomas P. Sawyers, Hempstead, TX (US); Jeff K. Jeansonne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 510 days.

(21) Appl. No.: 11/250,596

(22) Filed: Oct. 14, 2005

(65) Prior Publication Data

US 2006/0174143 A1     Aug. 3, 2006

Related U.S. Application Data

(60) Provisional application No. 60/649,448, filed on Feb. 1, 2005.

(51) Int. Cl.
*G06F 1/00* (2006.01)
*G06F 1/26* (2006.01)

(52) U.S. Cl. .................. 713/300; 713/320
(58) Field of Classification Search ............. 713/300
See application file for complete search history.

(56) References Cited

U.S. PATENT DOCUMENTS

| | | | |
|---|---|---|---|
| 5,382,893 A | 1/1995 | Dehnel | |
| 5,939,862 A | 8/1999 | Kates et al. | |
| 6,321,340 B1 | 11/2001 | Shin et al. | |
| 6,498,460 B1 | 12/2002 | Atkinson | |
| 6,498,957 B1 | 12/2002 | Umetsu | |
| 6,639,428 B2 | 10/2003 | Green et al. | |
| 2002/0065618 A1 | 5/2002 | Oh | |
| 2003/0025401 A1 | 2/2003 | Popescu-Stanesti et al. | |
| 2003/0117175 A1 | 6/2003 | Green et al. | |
| 2003/0159073 A1 | 8/2003 | Breen et al. | |
| 2003/0188211 A1 | 10/2003 | Chen | |
| 2004/0018774 A1 | 1/2004 | Long et al. | |
| 2004/0199800 A1* | 10/2004 | Yu et al. | 713/320 |
| 2005/0022043 A1 | 1/2005 | Yamaji | |

FOREIGN PATENT DOCUMENTS

| | | |
|---|---|---|
| GB | 2 341 247 | 3/2000 |
| GB | 2341247 | 8/2000 |

OTHER PUBLICATIONS

European Patent Office, "European Search Report", Jul. 28, 2008, Published in: EP.

* cited by examiner

*Primary Examiner*—Thomas Lee
*Assistant Examiner*—Stefan Stoynov

(57) ABSTRACT

In one embodiment, a power adapter comprises a power supply to output power for powering a powered device. The power adapter outputs information indicative of an amount of power output by the power supply for use by the powered device to control the amount of power used by the powered device.

16 Claims, 20 Drawing Sheets

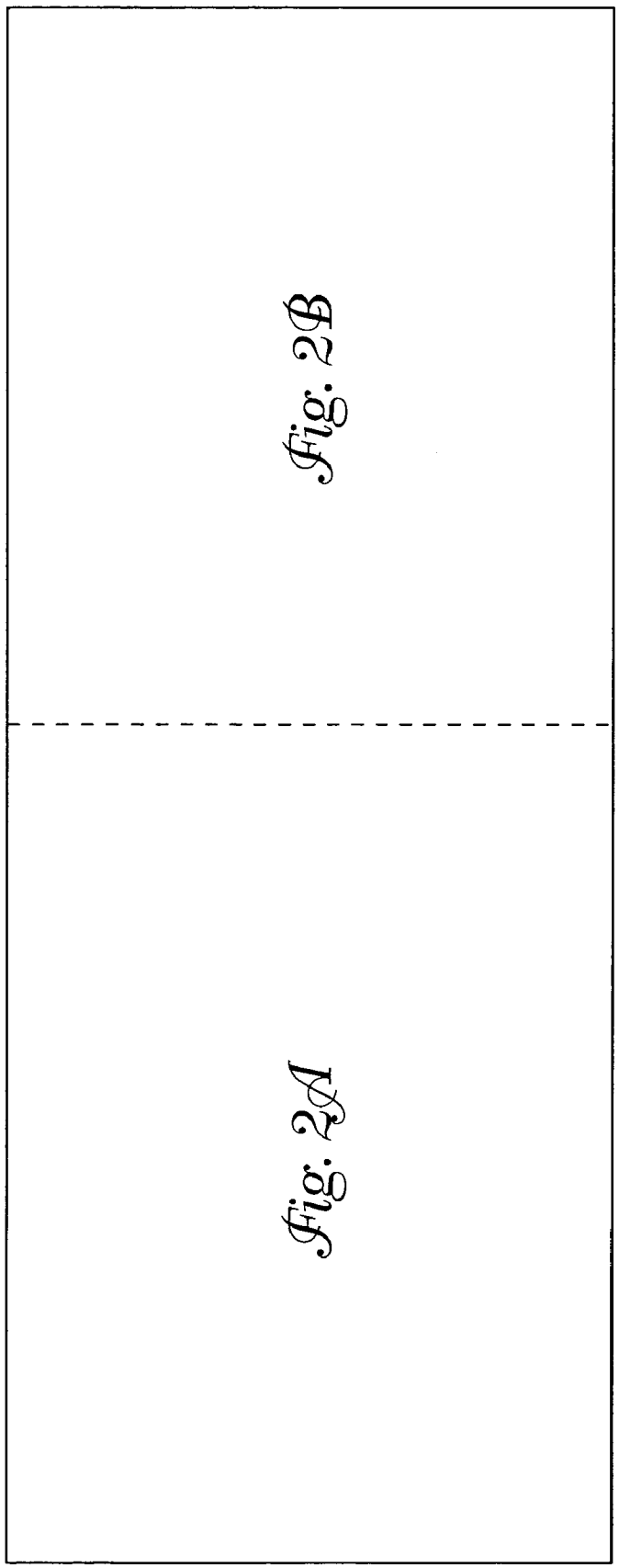

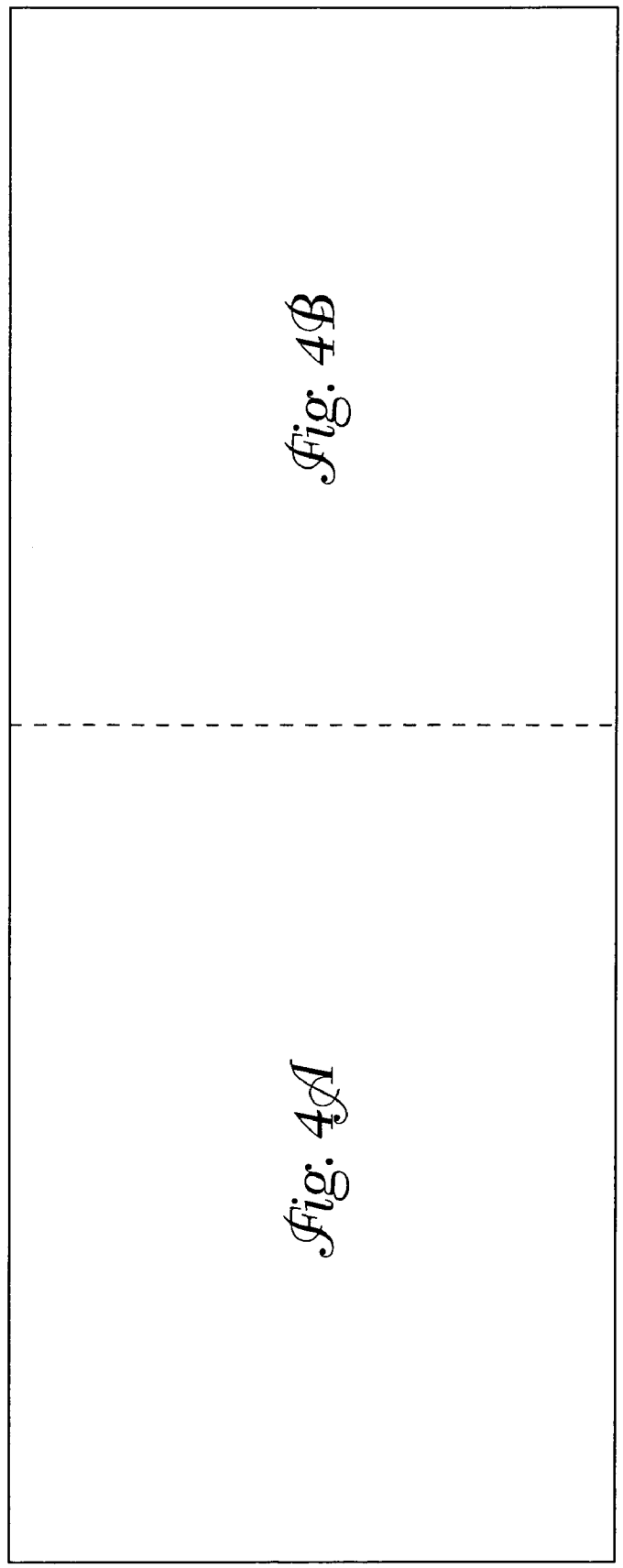

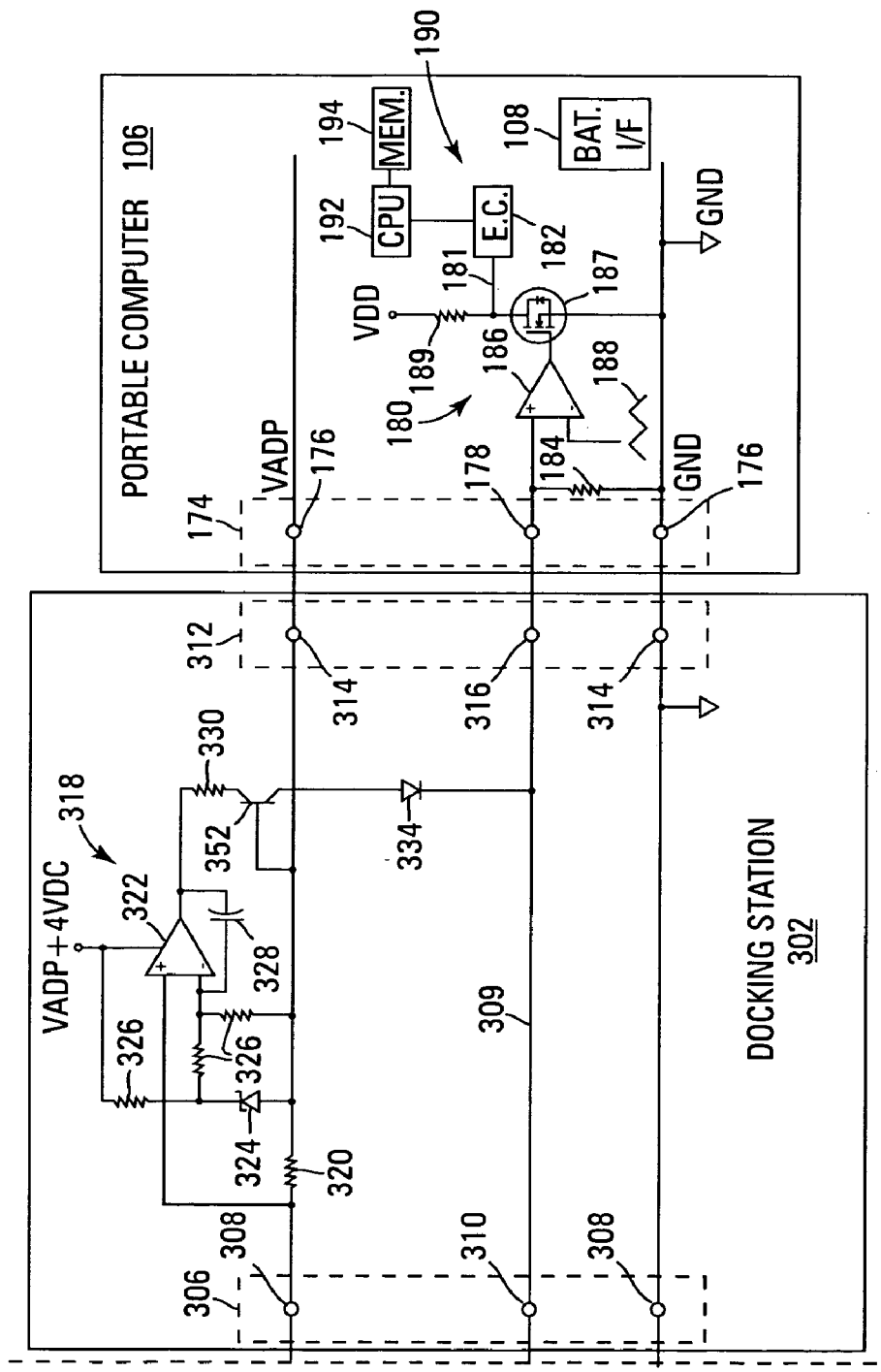

| POWER RATING | RESISTOR VALUES | |
|---|---|---|
| | Radp | Rnotebook |
| 50 | 499K | 249K |
| 65 | 383K | 191K |
| 90 | 294K | 147K |
| 120 | 221K | 110K |
| 135 | 169K | 84.5K |
| 180 | 130K | 64.9K |
| 220 | 100K | 49.9K |

Fig. 6

| | COMPUTER RATING (W) | | | | | | |
|---|---|---|---|---|---|---|---|
| ADAPTER RATING (W) | | 50 | 65 | 90 | 120 | 135 | 180 | 220 |
| | 50 | 0.48 | -0.54 | -1.44 | -2.30 | -2.95 | -3.49 | -3.93 |
| | 65 | 1.59 | 0.47 | -0.53 | -1.52 | -2.29 | -2.95 | -3.48 |
| | 90 | 2.76 | 1.58 | 0.48 | -0.63 | -1.52 | -2.29 | -2.94 |
| | 120 | 4.06 | 2.85 | 1.69 | 0.47 | -0.55 | -1.45 | -2.23 |
| | 135 | 5.26 | 4.07 | 2.88 | 1.59 | 0.48 | -0.53 | -1.43 |
| | 180 | 6.37 | 5.25 | 4.08 | 2.76 | 1.59 | 0.48 | -0.53 |
| | 220 | 7.40 | 6.36 | 5.25 | 3.95 | 2.75 | 1.58 | 0.48 |

Fig. 7

| | COMPUTER RATING (W) | | | | | | |
|---|---|---|---|---|---|---|---|
| ADAPT. RATING (W) | | 50 | 65 | 90 | 120 | 135 | 180 | 220 |
| | 50 | -0.49 | -1.35 | -2.10 | -2.82 | -3.37 | -3.82 | -4.19 |
| | 65 | 0.45 | -0.49 | -1.34 | -2.17 | -2.82 | -3.37 | -3.82 |
| | 90 | 1.43 | 0.44 | -0.48 | -1.42 | -2.17 | -2.82 | -3.36 |
| | 120 | 2.52 | 1.51 | 0.53 | -0.50 | -1.35 | -2.11 | -2.76 |
| | 135 | 3.53 | 2.53 | 1.53 | 0.45 | -0.48 | -1.34 | -2.10 |
| | 180 | 4.47 | 3.52 | 2.54 | 1.43 | 0.44 | -0.49 | -1.34 |
| | 220 | 5.33 | 4.46 | 3.52 | 2.43 | 1.42 | 0.44 | -0.49 |

Fig. 9

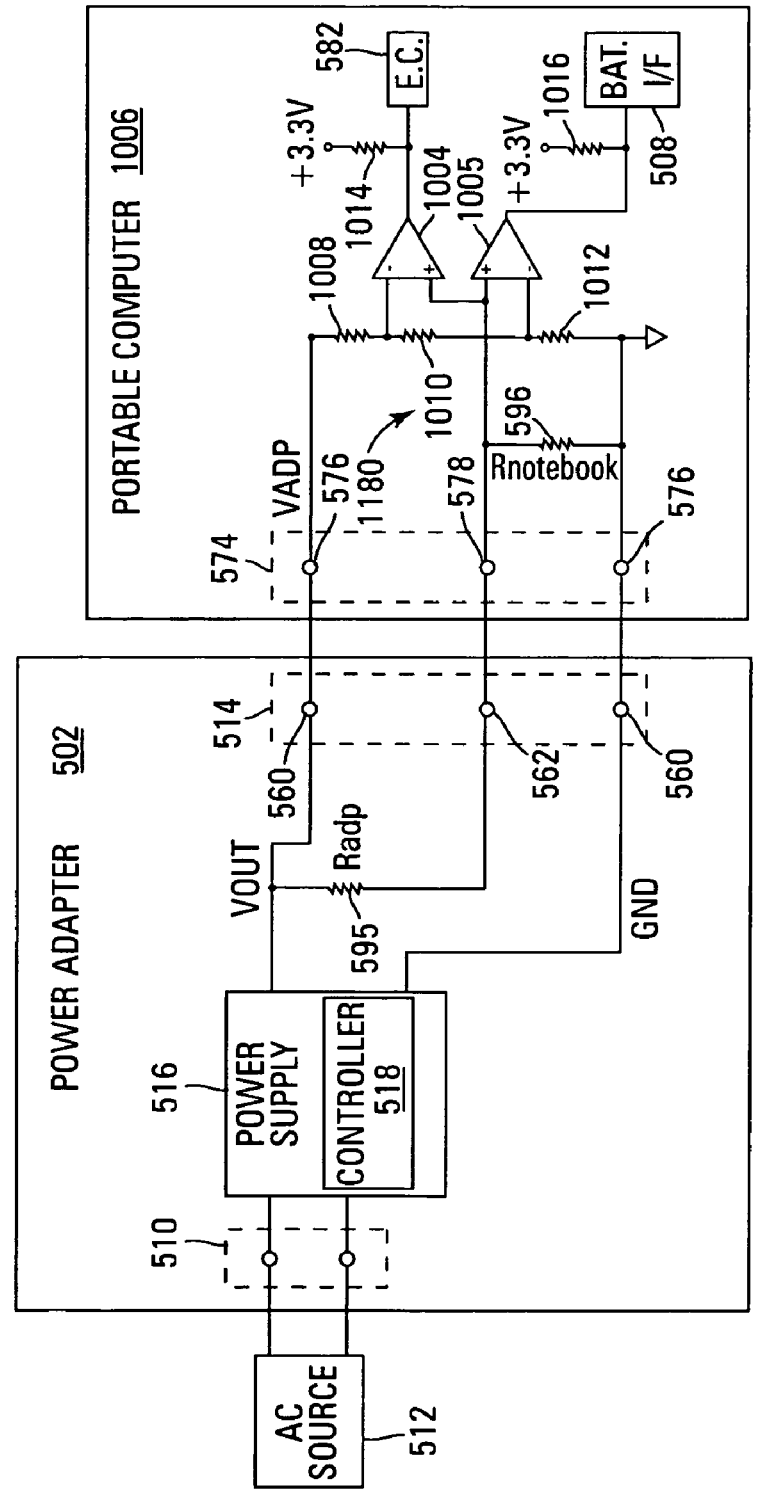

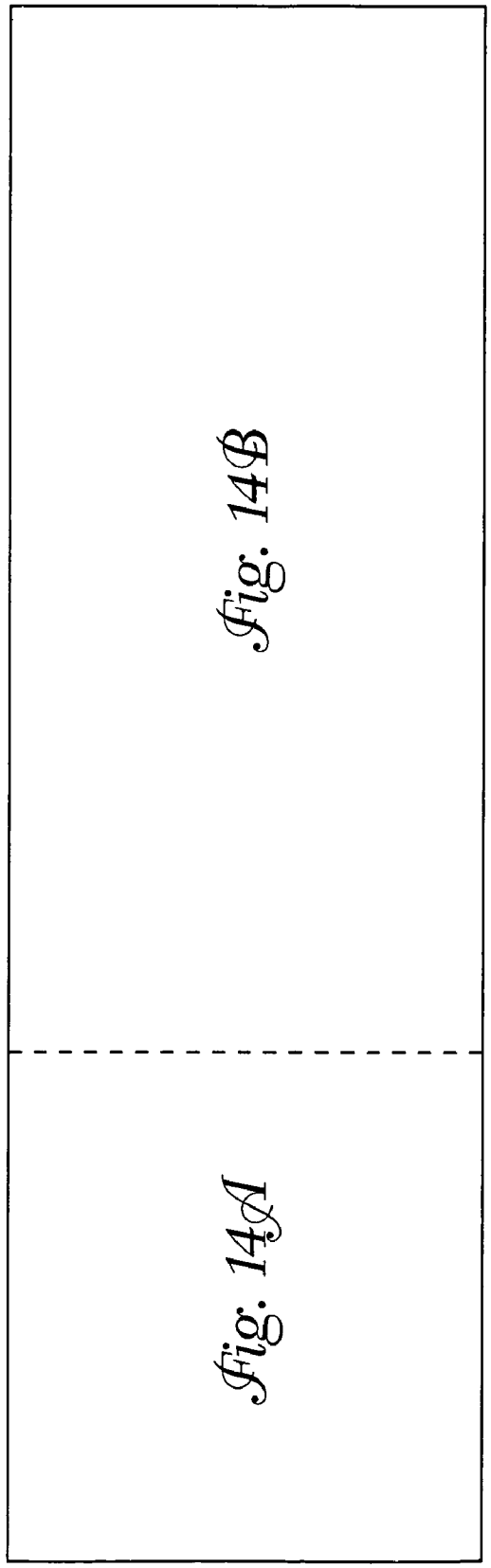

SYSTEMS AND METHODS FOR CONTROLLING USE OF POWER IN A COMPUTER SYSTEM

CROSS REFERENCE TO RELATED APPLICATION

This application claims the benefit of U.S. Provisional Patent Application Ser. No. 60/649,448, filed Feb. 1, 2005, which is incorporated by reference herein.

BACKGROUND

One way in which power is supplied to a portable computer is by using a power adapter. The power adapter is coupled to an alternating current (AC) power source (such as an AC outlet) and converts an AC line voltage to a lower, direct current (DC) voltage suitable for use by the portable computer. The power adapter is typically a unit that is separate from the portable computer. A portable computer is designed to be moved. When a portable computer is moved to a new location, a power adapter is often brought to the new location along with the portable computer. As a result, it is desirable to reduce the size and weight of the power adapter in order to facilitate the movement of the power adapter.

Typically, a portable-computer power adapter is designed to output a particular nominal output voltage for load currents up to a particular maximum current level. When the load current reaches or exceeds the maximum current level, the power adapter reduces the output voltage in order to attempt to prevent the load current from exceeding the maximum current level. Reducing the output voltage in this manner is referred to as "current limiting" the power adapter.

Typically, the power adapter powers various components of the portable computer (including, for example, a central processing unit (CPU), display, and a storage device such as an internal hard drive). In some situations, the power adapter also provides power to charge a battery housed within the portable computer. Moreover, in some situations, the power adapter provides power to one or more peripherals or other devices coupled to the portable computer (for example, a docking station or an external drive unit such as a CD, DVD, or floppy drive unit). Consequently, a portable-computer power adapter is typically used to provide power to a variety of loads.

One way in which a portable-computer power adapter is designed to work with a variety of loads is to design the power adapter for the largest load that the power adapter is expected to power. Designing a power supply in this way, however, typically results in a power adapter that is larger, heavier, and/or more expensive than a power adapter designed to provide less power.

One way in which the size, weight, and/or cost of the power adapter can be reduced is by reducing the largest load that the power adapter is expected to power. As a result, a power adapter that outputs less power can be used to power the reduced largest-expected load. One way in which the largest-possible load can be reduced is by reducing the amount of power consumed by the portable computer (for example, by reducing the clock frequency at which the portable computer's CPU is operated and/or by reducing the amount of power used to charge a battery housed within the portable computer). This reduction typically results in a degradation in the portable computer's performance (for example, by reducing the speed at which a CPU executes program instructions and/or increasing the amount of time required to charge a battery).

DRAWINGS

FIG. 2 is a diagram showing the relationship of FIGS. 2A and 2B.

FIG. 4 is a diagram showing the relationship of FIGS. 4A and 4B.

FIGS. 4A and 4B are a block diagram of one exemplary embodiment of a computing system in accordance with the invention.

FIG. 6 is a chart illustrating exemplary values of Radp and Rnotebook for various power ratings in one implementation of the system of FIG. 5.

FIG. 7 is a chart illustrating the voltage difference between the two inputs of a comparator of a portable computer implemented using the chart of FIG. 6 when a power adapter implemented using the chart of FIG. 6 is directly coupled to the portable computer.

FIG. 9 is a chart illustrating the voltage difference between the two inputs of a comparator of a portable computer implemented using the chart of FIG. 6 when a power adapter implemented using the chart of FIG. 6 is coupled to the portable computer via the docking station of FIG. 8.

FIG. 10 is a block diagram of one exemplary embodiment of a computing system in accordance with the invention.

FIG. 14 is diagram showing the relationship of FIGS. 14A and 14B.

Like reference numbers and designations in the various drawings indicate like elements.

DETAILED DESCRIPTION

Figure 1:
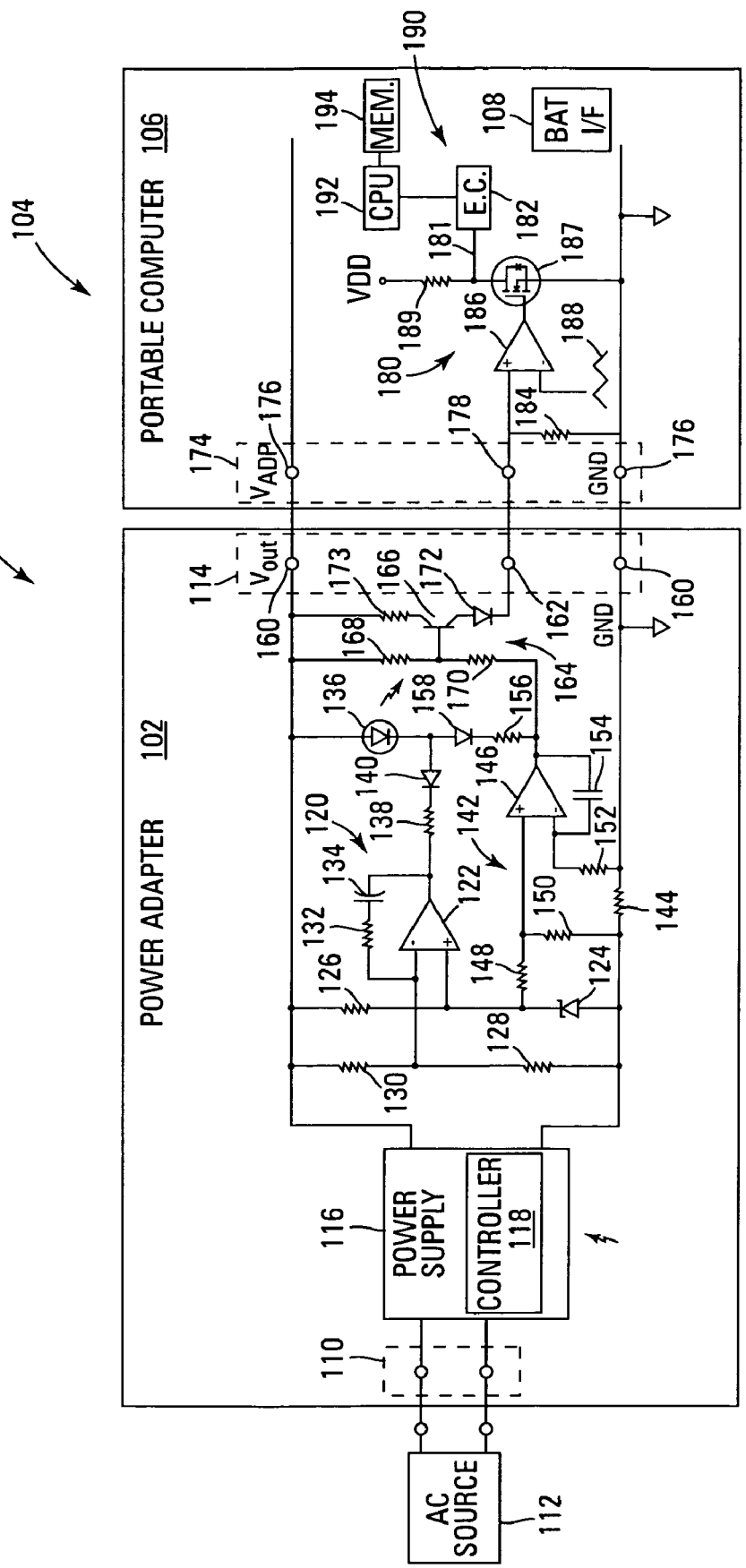
FIG. 1 is a high-level block diagram of one exemplary embodiment of a computing system in accordance with the invention.

FIG. 1 is a high-level block diagram of one embodiment of a computing system 100. The computing system 100 comprises a power adapter 102 that is used to power at least one powered device 104. In the particular embodiment shown in FIG. 1, the powered device 104 comprises a portable computer 106. The portable computer 106, in the embodiment shown in FIG. 1, can be powered by the power adapter 102 (when coupled thereto) or by a battery coupled to the portable computer 106 via a battery interface 108. In other embodiments, one or more other external devices that are communicatively coupled to the portable computer 106 (for example, a docking station or an external drive unit such as a CD, DVD, or floppy drive unit) are also powered by the power adapter 102. In some other embodiments, a power adapter is used to power other types of electronic devices such as other types of battery-powered devices.

The power adapter 102 comprises a power-source interface 110 that is used to couple the power adapter 102 to an AC power source 112 (such as an AC outlet). The power adapter 102 also comprises a device interface 114 that is used to couple the power adapter 102 to the powered device 104 (the portable computer 106 in the embodiment shown in FIG. 1). In one implementation of the embodiment shown in FIG. 1, the power adapter 102 is directly coupled to the power source 112 and to the portable computer 106 using appropriate cabling and connectors. In another embodiment, the power adapter 102 is coupled to the portable computer 106 indirectly via one or more intermediary devices such as a docking station.

The power adapter 102 also comprises a power supply 116 that converts an AC line voltage from the AC power source 112 to a lower DC voltage suitable for use by the portable computer 106. In the embodiment shown in FIG. 1, the power supply 116 is designed to output a particular nominal output voltage on the device interface 114 for use by the portable computer 106. The power supply 116 comprises any suitable power supply topology now known or later developed. In the embodiment shown in FIG. 1, the power supply 116 comprises a controller 118 that controls the voltage output by the power supply 116.

The power adapter 102 comprises a voltage sense circuit 120 that provides output voltage feedback to the controller 118, which uses the output voltage feedback to control the power supply 116. For example, in one embodiment, the output voltage feedback indicates when the output voltage of the power adapter 102 exceeds a nominal output voltage for the power adapter 102. In the particular embodiment shown in FIG. 1, the voltage sense circuit 120 comprises a voltage sense operational amplifier 122. The voltage sense operational amplifier 122 (also referred to here as the "voltage sense op amp" 122) receives a reference voltage (referred to here as the "voltage sense reference voltage") on the non-inverting input of the voltage sense op amp 122. The voltage sense reference voltage corresponds to (or is otherwise indicative of) the nominal output voltage of the power adapter 102. In the particular embodiment shown in FIG. 1, the voltage sense circuit 120 comprises a Zener diode 124 across which the voltage regulation op amp reference voltage is developed using an appropriate bias resistor 126.

A voltage indicative of the output voltage VOUT of the power adapter 102 is coupled to the inverting input of the voltage sense op amp 122. This voltage is taken between a pair of bias resistors 128 and 130. A resistor 132 and a capacitor 134 are coupled in series between the inverting input and the output of the voltage sense op amp 122 to provide control stability. The output of the voltage sense op amp 122 is coupled to an optocoupler diode 136 through a resistor 138 and a diode 140.

When the output voltage VOUT of the power adapter 102 is less than or equal to the nominal output voltage of the power adapter 102, the voltage sense op amp 122 outputs a "high voltage" value that is insufficient to turn on the diode 140. When the output voltage VOUT of the power adapter 102 is greater than the nominal output voltage of the power adapter 102, the output of the voltage sense op amp 122 falls. When the output of the op amp 122 falls enough to turn on the diode 140, current is driven through the optocoupler 136, which causes the controller 118 of the power supply 116 to limit the output voltage of the power adapter 102. The amount by which the controller 118 limits the output voltage of the power adapter 102 is based on the amount of current flowing through the optocoupler 136. The voltage sense circuit 120 and the controller 118 implement closed-loop control of the output voltage of the power adapter 102.

The power adapter 102 also comprises a current sense circuit 142. The current sense circuit 142 provides load current feedback to the controller 118, which uses the load current feedback to control the power supply 116. For example, in one embodiment, the load current feedback indicates when the load current has reached a maximum current level for the power adapter 102, which causes the controller 118 to reduce the output voltage of the power adapter 102 (which in turn reduces the load current output by the power adapter 102).

In the particular embodiment shown in FIG. 1, the current sense circuit 142 comprises a current sense resistor 144 through which the load current of the power adapter 102 flows. The current sense circuit 142 also comprises a current sense operational amplifier 146 (also referred to here as the "current sense op amp" 146). A voltage reference (referred to here as the "current sense op amp reference voltage") is coupled to the non-inverting input of the current sense op amp 146. The current sense op amp reference voltage corresponds to a predetermined threshold load current value (also referred to here as the "throttle current threshold") for the power adapter 102. In the particular embodiment shown in FIG. 1, the current sense circuit 142 comprises a pair of resistors 148 and 150 in series with the cathode of the Zener diode 124 and one end of the current sense resistor 144. A voltage indicative of the load current of the power adapter 102 is coupled to the inverting input of the current sense op amp 146 by coupling the inverting input of the current sense op amp 146 to the other end of the current sense resistor 144 via a resistor 152. A capacitor 154 is coupled between the inverting input and the output of the current sense op amp 146 to provide control stability. The output of the current sense op amp 146 is coupled to the optocoupler diode 136 through a resistor 156 and a diode 158.

When the load current output by the power adapter 102 is less than or equal to the throttle current threshold of the power adapter 102, the current sense op amp 146 outputs a "high voltage" value that is insufficient to turn on the diode 158. When the load current of the power adapter 102 is greater than the throttle current threshold of the power adapter 102, the output of the current sense op amp 146 falls. In the embodiment shown in FIG. 1, the current sense circuit 142 is configured so that when the load current reaches the maximum current level for the power adapter 102, the output of the current sense op amp 146 falls enough to turn on the diode 158 and drive current through the optocoupler 136. When current is driven through the optocoupler 136, the controller 118 of the power supply 116 limits the output voltage of the power adapter 102 based on the amount of current flowing through the optocoupler 136. By reducing the output voltage of the power adapter 102, the load current of the power adapter 102 is reduced or limited. The current sense circuit 142 and the controller 118 implement closed-loop control of the load current of the power adapter 102 in an attempt to keep the load current of the power adapter 102 below the maximum current level for the power adapter 102.

The device interface 114 of the power adapter 102 comprises a pair of power terminals 160 that are used to provide power to the portable computer 106. In the particular embodiment shown in FIG. 1, the power terminals 160 include an output voltage terminal (VOUT) and a ground terminal (GND). The device interface 114 further comprises a control terminal 162 over which information indicative of the amount of power output by the power adapter 102 is supplied to the portable computer 106, which uses the information to control how much power is used by the portable computer 106. In the embodiment shown in FIG. 1, the information indicative of the amount of power output by the power adapter 102 comprises a control signal output by the power adapter 102. The control signal is indicative of the amount of power output by the power adapter 102. The power adapter 102 comprises a control signal circuit 164 that outputs the control signal. In other embodiments, the information indicative of the amount of power output by the power adapter 102 is communicated to a powered device 104 in other ways.

In the embodiment shown in FIG. 1, the control signal is a function of the load current output by the power adapter 102. When the load current output by the power adapter 102 is less than the throttle current threshold, the control signal circuit 164 does not output by a control signal. When the load current output by the power adapter 102 exceeds the throttle current threshold, the control signal circuit 164 outputs a control signal. Moreover, in the embodiment shown in FIG. 1, the amount of current output by the control circuit 164 on the control signal is indicative of how much the load current of the power adapter 102 exceeds the throttle current threshold. The control signal circuit 164, in such an embodiment, uses the load current feedback provided by the current sense circuit 142 to determine when and by how much the load current of the power adapter exceeds the throttle current threshold. The control signal generated by the control signal circuit 164 is used by at least one powered device 104 that is communicatively coupled to the control terminal 162 to control the amount of power used by that device 104.

In the particular embodiment shown in FIG. 1, the control signal circuit 164 comprises a transistor 166. The output of the current sense op amp 146 of the current sense circuit 142 is coupled to the output voltage terminal VOUT of the device interface 114 via resistors 168 and 170. The voltage at the node between the resistors 168 and 170 is coupled to the base of the transistor 166. The emitter of the transistor 166 is coupled to the output voltage terminal VOUT of the device interface 114 via resistor 173. The control terminal 162 of the device interface 114 is coupled to the collector of the transistor 166 via a diode 172. When the load current output by the power adapter 102 is less than or equal to the throttle current threshold of the power adapter 102, the current sense op amp 146 outputs a "high voltage" value such that the voltage difference between the output of the current sense op amp 146 and the output voltage VOUT of the power adapter 102 (and the resulting current flowing to the base of the transistor 166) is insufficient to turn on the transistor 166.

As noted above, when the load current of the power adapter 102 is greater than the throttle current threshold of the power adapter 102, the output of the current sense op amp 146 falls. When the output of the op amp 146 falls enough so that the voltage difference between the output of the op amp 146 and the output voltage of the power adapter 102 is sufficient to turn on the transistor 166, a current flows from the emitter to the collector of the transistor 166. The current that flows from the emitter to the collector of the transistor 166 is output on the control terminal 162 as the control signal. In such an embodiment, the control signal circuit 164 is configured so that when the transistor 166 turns on, the current flowing from the emitter to the collector of the transistor 166 (that is, the control signal) is proportional to the voltage output by the current sense op amp 146, which is proportional to the amount by which the load current output by the power adapter 102 exceeds the threshold current level.

The control signal circuit 164 and/or the current sense circuit 142 are configured so that the control signal circuit 164 outputs the control signal before the power adapter 102 is current limited (if at all). By outputting the control signal before the power adapter 102 is current limited, the portable computer 106 is able to attempt to reduce the amount of power used by the portable computer 106. Where the amount of power used by the portable computer 106 is reduced sufficiently to keep the load current output by the power adapter 102 below the maximum current level for the power adapter 102, the power adapter 102 does not current limit. For example, in the embodiment shown in FIG. 1, the resistors 156, 168 and 170 are selected so that, as the load current output by the power adapter 102 rises, transistor 166 turns on and drives the control signal on the control terminal 162 before the diode 158 turns on and drives current through the optocoupler 136.

At least one of the powered devices 104 powered by the power adapter 102 comprises an adapter interface that is used to couple the powered device 104 to the power adapter 102. In the embodiment shown in FIG. 1, the portable computer 106 comprises an adapter interface 174. The adapter interface 174 comprises a pair of power terminals 176 that are used to receive power from the power adapter 102 via the power terminals 160 of the power adapter's device interface 114. In the particular embodiment shown in FIG. 1, the power terminals 176 include an input voltage terminal (VADP) and a ground terminal (GND) that are coupled to the output voltage terminal VOUT and the ground terminal GND, respectively, of the power adapter's device interface 114.

The adapter interface 174 further comprises a control terminal 178 over which the control signal output by the power adapter 102 is received by the portable computer 106. The portable computer 106 uses the control signal to implement closed-loop feedback in order to control the amount of power used by the portable computer 106. In the particular embodiment shown in FIG. 1, a throttle signal circuit 180 uses the control signal output by the power adapter 102 as an input. The throttle signal circuit 180 outputs a throttle signal 181 when the control signal indicates that the amount of power used by the portable computer 106 should be reduced. The throttle signal 181, in such an embodiment, is an input to an embedded controller 182, which causes the portable computer 106 to reduce the amount of power used by the portable computer 106 when instructed to do so by the throttle signal 181.

In the particular embodiment shown in FIG. 1, the throttle signal circuit 180 uses pulse width modulation to output the throttle signal 181, where the duty cycle of the throttle signal 181 is indicative of the amount by which the load current output by the power adapter 102 exceeds the throttle current threshold. The throttle signal circuit 180, in the embodiment shown in FIG. 1, comprises a resistor 184 through which the control signal is terminated to ground. The voltage developed across the resistor 184 is coupled to the non-inverting input of a comparator 186. The inverting input of the comparator 186 is coupled to a source 188 of a sawtooth wave. The comparator 186 compares the sawtooth wave to the voltage developed across the resistor 184. The output of the comparator 186 is converted to an active-low, logic voltage level by a metal oxide semiconductor field effect transistor (MOSFET) 187 and the throttle signal 181 is taken at the drain of the MOSFET transistor 187. The output of the comparator 186 is coupled to the gate of the MOSFET 187. The source of the MOSFET 187 is coupled to ground GND and the drain of the MOSFET 187 is coupled to a logic voltage level (VDD) via a resistor 189.

When the load current output by the power adapter 102 is below the threshold current level, the current flowing on the control signal is zero and the voltage at the non-inverting input of the comparator 186 is zero. As a result, for the entire period of the sawtooth wave, the voltage on the non-inverting input of the comparator 186 will be less than the voltage on the inverting input of the comparator 186 and the output of the comparator 186 will be zero. Consequently, the transistor 187 is not turned on and the throttle signal 181 has a logical high value (that is, is not asserted) for the entire period of the sawtooth wave (that is, the duty cycle for the throttle signal 181 is zero percent).

The output of the comparator 186 has a non-zero value for that part of the period of the sawtooth wave where the voltage on the non-inverting input of the comparator 186 is greater than the voltage on the inverting input of the comparator 186. When the output of the comparator 186 has a value that is sufficient to turn on the transistor 187, the throttle signal 181 has a logical low value (that is, is asserted). In this way, the control signal is used to pulse width modulate the throttle signal 181. In one embodiment, the throttle signal circuit 180 is configured so that the duty cycle of the throttle signal 181 is zero percent when the load current output by the power adapter 102 is less than the throttle current threshold. In such an embodiment, the throttle signal circuit 180 is also configured so that the duty cycle of the throttle signal 181 is between zero percent and one-hundred percent when the load current output by the power adapter 102 is greater than the throttle current threshold but less than the maximum current level. In such an embodiment, the throttle signal circuit 180 is also configured so that the duty cycle of the throttle signal 181 is one-hundred percent when the load current is greater than or equal to maximum current level.

In the embodiment shown in FIG. 1, the portable computer 106 comprises various computer components 190 that are used to implement various computational and input/output functionality supported by the portable computer 106. The portable computer 106 comprises at least one central processing unit (CPU) 192 and memory 194. The CPU 192 executes various items of software, including, for example, an operating system and one or more applications. Typically, a portion of the software executed by the CPU 192 and one or more data structures used by the software during execution are stored in the memory 194. Memory 194 comprises any suitable memory such as, for example, random access memory (RAM), read only memory (ROM), and/or registers within the CPU 192. In the embodiment shown in FIG. 1, one way in which the portable computer 106 reduces the amount of power used by the portable computer 106 is to reduce the clock frequency at which the CPU 192 operates. In the embodiment shown in FIG. 1, the CPU 192 includes the ability to change the clock frequency at which the CPU 192 operates in order to manage the amount of power used to operate the CPU 192.

In the embodiment shown in FIG. 1, the embedded controller 182 controls the operation of one or more of the other components in the portable computer 106. Among other things, the embedded controller 182 controls the amount of power used by the portable computer 106 based on the control signal received on the adapter interface 174 from the power adapter 102. The embedded controller 182, in one such embodiment, comprises a programmable processor that executes program instructions (for example, software or firmware) that cause the embedded controller 182 to carry out at least a portion of the functionality described here as being performed by the embedded controller 182. In the embodiment shown in FIG. 1, the embedded controller 182 reduces the clock frequency at which the CPU 192 operates in order to reduce the amount of power used by the portable computer 106. In some other embodiments, the embedded controller 182 reduces the amount of power used by the portable computer 106 in other ways (for example, by reducing the amount of power used to charge a battery or by dimming a display device included in the portable computer 106) in addition to or instead of reducing the clock frequency at which the CPU 192 operates. Moreover, in some other embodiments, the amount of power used by the portable computer 106 is controlled in other ways in addition to or instead of by using an embedded controller 182.

The various components of the portable computer 106 are coupled to one another as needed using appropriate interfaces (for examples, using buses, ports, and the like).

In the embodiment shown in FIG. 1, when the load current output by the power adapter 102 exceeds the throttle current threshold for the power adapter 102, the control signal circuit 164 of the power adapter 102 outputs the control signal. The amount of current flowing in the control signal is used to indicate by how much the load current output by the power adapter 102 exceeds the throttle current threshold for the power adapter 102. The throttle signal circuit 180 of the portable computer 106 receives the control signal from the power adapter 102 on the control terminal 178 and outputs the throttle signal 181 based on the received control signal. In the embodiment shown in FIG. 1, the throttle signal 181 is a pulse width modulated signal where the duty cycle of the throttle signal 181 indicates by how much the load current of the power adapter 102 exceeds the throttle current threshold for the power adapter 102. The embedded controller 182 reduces the amount of power used by the portable computer 106 by reducing the clock frequency at which the CPU 192 operates based on the throttle signal 181. In the embodiment shown in FIG. 1, the embedded controller 182 uses the throttle signal 181 output by the throttle signal circuit 180 to drive a stop clock input of the CPU 192 in order to reduce the clock frequency at which the CPU 192 operates. The clock frequency of the CPU 192 is "throttled" when the throttle signal 181 is asserted. As a result, the clock frequency of the CPU 192 is reduced by an amount that is proportional to the duty cycle of the throttle signal 181. In this way, closed-loop feedback is used to control the amount of power consumed by the portable computer 106. In other embodiments, the clock frequency of the CPU 192 is reduced based on the control signal in other ways (for example, by driving a stop clock input of the CPU 192 directly with the throttle signal 181 output by the throttle signal circuit 180). Where such closed-loop feedback control causes (when appropriate) the amount of current drawn by the portable computer 106 to be reduced such that load current output by the power adapter 102 does not exceed the maximum current level for the power adapter 102, the power adapter 102 is not current limited.

Because the control signal output by the power adapter 102 is indicative of the total load current output by the power adapter 102 to all of the powered devices 104 coupled to the power adapter 102, each of the powered devices 104 need not include circuitry for measuring the amount of current used by the respective powered device 104 nor estimate or otherwise determine how much power the power adapter 102 is capable of outputting. Consequently, a powered device 104 can use the control signal output by the power adapter 102 to more precisely control the amount of power used by the powered device 104. Also, different power adapters 102 that are capable of outputting different amounts of power can be used to power the powered devices 104 while still having the powered device 104 control how power is used.

The particular embodiment shown in FIG. 1 illustrates one example of how the control signal output by the power adapter 102 can be used to control the amount of power used by a powered device 104 such as a portable computer 106. In other embodiments and implementations, the control signal output by the power adapter 102 is used in other ways to control the amount of power used by a powered device 104. For example, in one such alternative embodiment, the control signal output by the power adapter 102 is used by the portable computer 106 to control the amount of power that is used for battery charging (for example, by a battery charger included in the battery interface 108) in addition to and/or instead of controlling the amount of power used by the central processing unit 192. In one exemplary implementation of such an embodiment, the battery charger compares the voltage developed across the resistor 184 to a reference voltage. When the voltage across the resistor 184 is greater than the reference voltage, the battery charger reduces the amount of power used by the battery charger for charging any batteries coupled to the portable computer 106 (that is, the battery charger is "throttled"). In such an exemplary implementation, the amount by which the battery charger reduces the power used for battery charging is proportional to the amount by which the voltage across the resistor 184 exceeds the reference voltage (until no power is used for battery charging).

In one such implementation, the battery charger and/or the throttle signal circuit 180 are configured so that when the control signal is being output by the power adapter 102 (which indicates that the amount of power used by the portable computer 106 should be reduced), the amount of power used for battery charging is reduced before the frequency at which the CPU 192 operates is reduced. In some situations, by reducing the amount of power used for battery charging, the amount of power used by the portable computer 106 can be reduced enough to avoid throttling the CPU 192. For example, in one such implementation, the throttle signal circuit 180 is configured so that the sawtooth wave used by the throttle signal circuit 180 has a DC offset that is greater than the reference voltage used by the battery charger. In such an implementation, when the voltage developed across the resistor 184 is greater than the reference voltage used by the battery charger but is less than the DC offset of the sawtooth wave, the duty cycle of the throttle signal 181 is zero percent. In such a situation, the battery charger reduces the amount of power used for battery charging but the CPU 192 is not throttled.

Moreover, the particular embodiment shown in FIG. 1 illustrates one example of how the control signal can be generated by the power adapter 102. In other embodiments and implementations, the control signal is generated by the power adapter 102 in other ways. For example, in the particular embodiment shown in FIG. 1, the control signal circuit 164 and the current limit feedback loop used to control the power supply 116 make use of the same operational amplifier (that is, current sense op amp 146). In an alternative embodiment, separate operational amplifiers (or other comparators) are used in the control signal circuit 164 and the current limit feedback loop used to control the power supply 116.

Figure 2A:
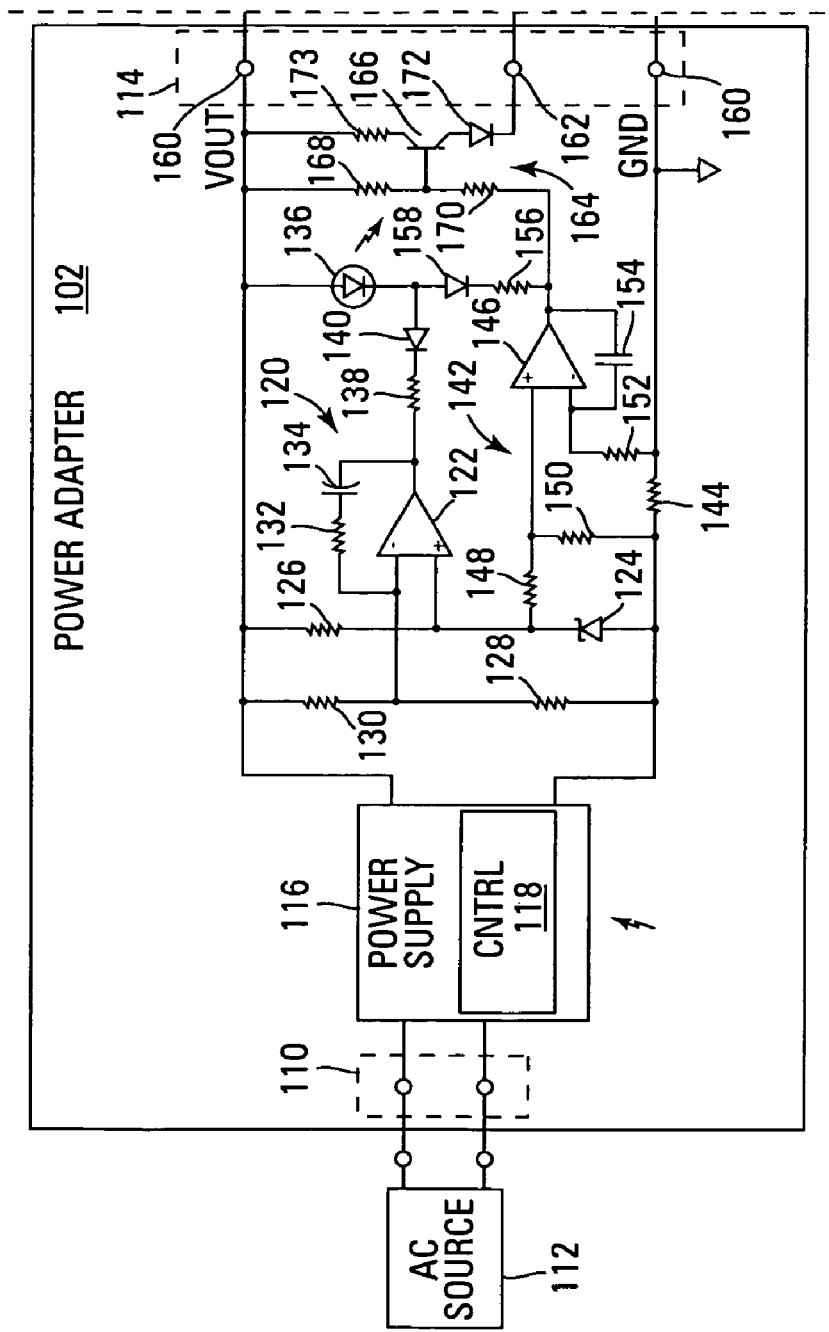
FIGS. 2A and 2B are a block diagram of one exemplary embodiment of a computing system in accordance with the invention.
Figure 2B:
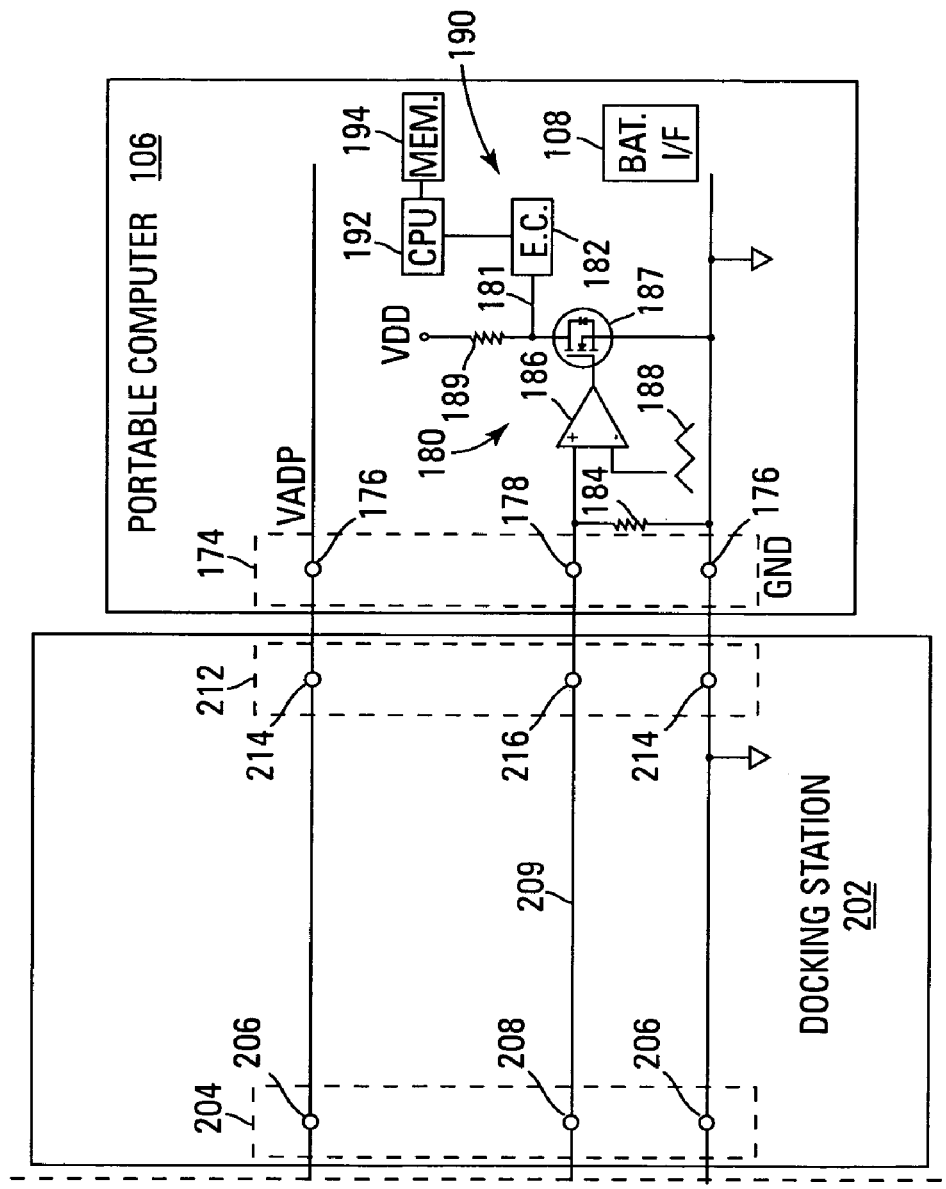

In the particular embodiment shown in FIG. 1, the control signal output by the power adapter 102 is directly coupled to the powered device 104 and is supplied to the portable computer 106 using the same interface used to supply power to the portable computer 106. In other embodiments and implementations, the control signal output by the powered device 102 is communicated to the powered device 104 in other ways. For example, in one embodiment, the control signal output by the power adapter 102 is communicated to the powered device 104 via one or more intermediary devices (such as a docking station). One example of such an embodiment is shown in FIG. 2. Also, in other embodiments, the control signal is communicated to the portable computer 106 using an interface (for example, a signal interface) other than the interface used to supply power to the portable computer 106.

FIG. 2 is a block diagram of one embodiment of a computing system 200. In the embodiment shown in FIG. 2, the portable computer 106 of FIG. 1 is inserted into or is otherwise coupled to a docking station 202 and the portable computer 106, the docking station 202, and any devices coupled to the portable computer 106 or the docking station 202 are powered by the power adapter 102 of FIG. 1. The docking station 202, in the embodiment shown in FIG. 2, includes an adapter interface 204 that is used to couple the docking station 202 to the power adapter 102. The adapter interface 204 of the docking station 202 comprises a pair of power terminals 206 that are used to receive power from the power adapter 102 via the power terminals 160 of the power adapter's device interface 114. In the particular embodiment shown in FIG. 2, the power terminals 206 of the adapter interface 204 include an input voltage terminal and a ground terminal that are coupled to the output voltage terminal VOUT and the ground terminal GND, respectively, of the power adapter's device interface 114. The adapter interface 204, in the embodiment shown in FIG. 2, comprises a control terminal 208 over which information indicative of the amount of power output by the power adapter 102 is received from the power adapter 102. In the embodiment shown in FIG. 2, the information indicative of the amount of power output by the power adapter 102 comprises a control signal received from the power adapter 102 by the docking station 202 on the control terminal 208 of the adapter interface 204.

The docking station 202 further comprises a device interface 212 (also referred to here as the "portable computer interface" 212) that is used to couple the docking station 202 to the portable computer 106. The portable computer interface 212 comprises a pair of power terminals 214. In the embodiment shown in FIG. 2, the pair of power terminals 214 comprises an output voltage terminal and a ground terminal. The output voltage terminal and the ground terminal of the portable computer interface 212 of the docking station 202 are coupled to the input voltage terminal VADP and the ground terminal GND of the portable computer's adapter interface 174. In the embodiment shown in FIG. 2, the device interface 212 is shown as being coupled to the adapter interface 174. The portable computer interface 212, in the embodiment shown in FIG. 2, further comprises a control terminal 216 over which information indicative of the amount of power output by the power adapter 102 received from the portable adapter 102 is supplied to the portable computer 106. In the embodiment shown in FIG. 2, the information indicative of the amount of power output by the power adapter 102 comprises a control signal received from the power adapter 102. The control signal is output by the docking station 202 on the control terminal 216 to the portable computer 106. The control signal is indicative of the amount of power that is being output by the power adapter 102 to the docking station 202. In this embodiment, the control signal is a function of the load current output by the power adapter 102.

In the embodiment shown in FIG. 2, power received on the power terminals 206 of the adapter interface 204 is used to power one or more components (for example, one or more light-emitting diodes) included in the docking station 202. Also, in the embodiment shown in FIG. 2, power received on the power terminals 206 of the adapter interface 204 is used to power the portable computer 106 coupled to the docking station 202 and any number of other external devices (for example, external drive units such as an external floppy, hard disk, CD, or DVD drive or external input devices such as external keyboards or pointing devices). In the embodiment shown in FIG. 2, the portable computer 106 is coupled to the power terminals 206 in order to receive power from the power adapter 102 and is coupled to the control terminal 208 in order to receive the control signal from the power adapter 102. In the particular embodiment shown in FIG. 2, the docking station 202 passes the control signal through to the portable computer 106 on control signal line 209 without processing or otherwise using the control signal.

The portable computer 106 uses the control signal output by the power adapter 102 to control the amount of power used by the portable computer 106 in the manner described above in connection with FIG. 1. As noted above, the control signal is generated by the power adapter 102 based on the total load current output by the power adapter 102, which includes the current used by all of the devices powered by the portable adapter 102 (that is, the docking station 202, the portable computer 106, and any external devices).

The portable computer 106, by using the control signal, controls the amount of power used by the portable computer 106 based on the total amount of power supplied by the power adapter 102 to all devices powered by the power adapter 102. The control signal generated by the power adapter 102 indicates to the portable computer 106 when the load current output by the power adapter 102 exceeds the throttle current threshold, which indicates that the power adapter 102 is nearing the maximum current level for the power adapter 102. The portable computer 106, in response to the control signal, throttles the CPU 194 or otherwise reduces the amount of power used by the portable computer 106. With such an approach, the portable computer 106 need not itself measure how much power is being used by each of the devices powered by the power adapter 102 or know how much power the power adapter 102 is capable of outputting.

In the particular embodiment shown in FIG. 2, the device interface 212 is coupled to the adapter interface 174 of the power computer 106, which is also used to couple the portable computer 106 directly to the power adapter 102. In other embodiments and implementations, the portable computer 106 comprises a separate interface (for example, a "docking station interface") for coupling the portable computer 106 to the device interface 212 of the docking station 202.

Figure 3:
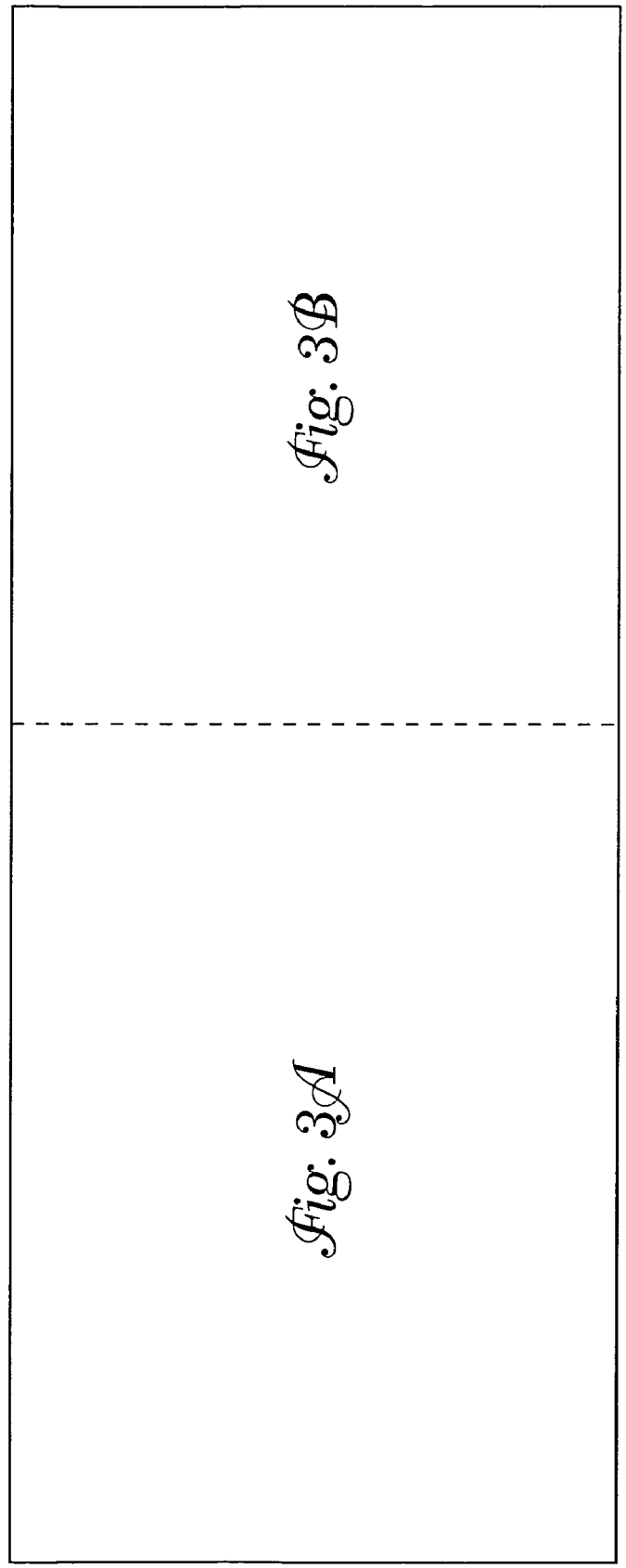
FIG. 3 is a diagram showing the relationship of FIGS. 3A and 3B.
Figure 3A:
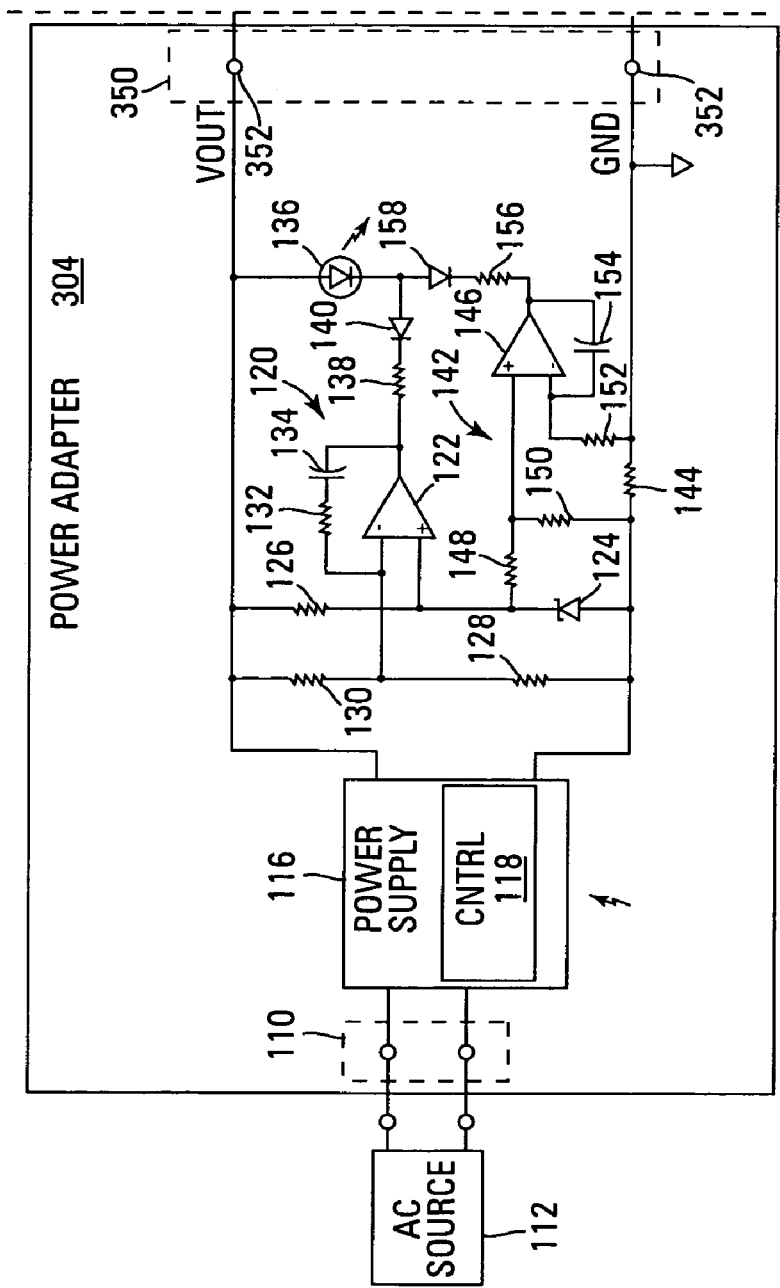
FIGS. 3A and 3B are a block diagram of one exemplary embodiment of a computing system in accordance with the invention.
Figure 3B:
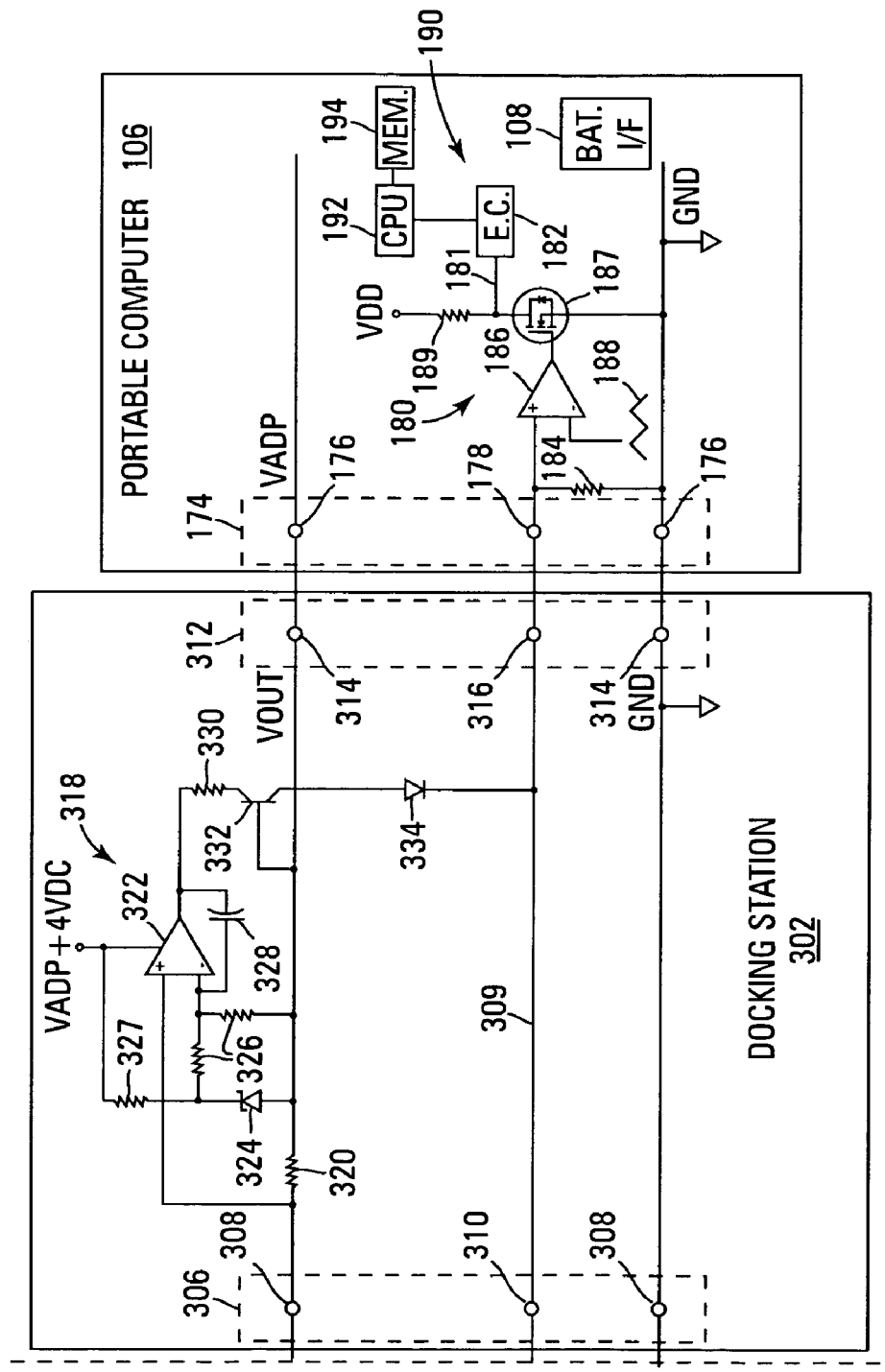

FIG. 3 is a block diagram of one embodiment of a computing system 300. In the embodiment shown in FIG. 3, the portable computer 106 of FIG. 1 is inserted into or is otherwise coupled to a docking station 302 and the portable computer 106, the docking station 302, and any devices coupled to the portable computer 106 or the docking station 302 are powered by a power adapter 304.

The power adapter 304, in the embodiment shown in FIG. 3, is similar to the power adapter 102 of FIG. 1 except that the power adapter 304 does not output a control signal (or other information indicative of the amount of power output by the power adapter 304) and does not include a control signal circuit 164 or a control terminal 162. That is, the power adapter 304 comprises a device interface 350 that comprises a pair of power terminals 352 but does not include a control terminal over which a control signal is output. In the particular embodiment shown in FIG. 3, the power terminals 352 include an output voltage terminal VOUT and a ground terminal GND. Otherwise, the power adapter 304 is similar to the power adapter 102 of FIG. 1 and similar components are referenced in FIG. 3 using the same reference numerals used in FIG. 1 for those components.

The docking station 302, in the embodiment shown in FIG. 3, includes an adapter interface 306 that is used to couple the docking station 302 to the power adapter 304. The adapter interface 306 of the docking station 302 comprises a pair of power terminals 308 that are used to receive power from the power adapter 304 via the power terminals 352 of the power adapter's device interface 350. In the particular embodiment shown in FIG. 3, the power terminals 308 include an input voltage terminal and a ground terminal that are coupled to the output voltage terminal VOUT and the ground terminal GND, respectively, of the power adapter's device interface 350. The adapter interface 306, in the embodiment shown in FIG. 3, comprises a control terminal 310 for receiving a control signal. However, as noted above, in the particular embodiment shown in FIG. 3, the power adapter 304 does not output a control signal. The control terminal 310 of the adapter interface 306 can be used to receive a control signal from a different power adapter that outputs a control signal (for example, the portable adapter 102 of FIG. 1).

The docking station 302 further comprises a device interface 312 (also referred to here as the "portable computer interface" 312) that is used to couple the docking station 302 to the portable computer 106. The portable computer interface 312 comprises a pair of power terminals 314. In the embodiment shown in FIG. 3, the pair of power terminals 314 comprises an output voltage terminal and a ground terminal. The output voltage terminal and the ground terminal of the docking station's portable computer interface 312 are coupled to the input voltage terminal VADP and the ground terminal GND of the portable computer's adapter interface 174.

The docking station 302 generates information indicative of the amount of power received by the docking station 302 from the power adapter 304. In the embodiment shown in FIG. 3, the information indicative of the amount of power received by the docking station 302 from the power adapter comprises a control signal that is a function of the load current received by the docking station 302 from the power adapter 304. The portable computer interface 312 further comprises a control terminal 316 over which the control signal is output by the docking station 302 to the portable computer 106. In other embodiments, the information indicative of the amount of power received by the docking station 302 from the power adapter 304 is communicated to the portable computer 106 in other ways.

In the embodiment shown in FIG. 3, the docking station 302 comprises a docking station control signal circuit 318 that outputs the control signal. The docking station control signal circuit 318 outputs the control signal when the load current received by the docking station 302 exceeds a throttle current threshold. In the embodiment shown in FIG. 3, the docking station control signal circuit 312 does not output the control signal when the load current received by the docking station 302 is less than the throttle current threshold. In the embodiment shown in FIG. 3, the docking station 302 uses a predetermined throttle current threshold for any power adapter that is coupled to the docking station 302, regardless of how much power any particular power adapter coupled to the docking station 302 is capable of outputting.

In the embodiment shown in FIG. 3, the docking station control signal circuit 318 comprises a current sense resistor 320 coupled in series between the input voltage terminal of the adapter interface 306 and the output voltage terminal of the portable computer interface 312. One end of the current sense resistor 320 is coupled to the non-inverting input of a current sense operational amplifier 322 (also referred to here as the "docking station current sense op amp" 322). A reference voltage (also referred to here as "the docking station reference voltage") is coupled to the inverting input of the docking station current sense op amp 322. The docking station reference voltage is developed and coupled to the inverting input of the op amp 322 using a Zener diode 324 and appropriate bias resistors 326. The Zener diode 324 is coupled to the supply voltage (VADP+4VDC) for the op amp 322 through a resistor 327. A capacitor 328 is coupled between the inverting input and the output of the op amp 322 to provide control stability. The output of the docking station current sense op amp 322 is coupled via a resistor 330 to the emitter of a transistor 332. The base of the transistor 332 is coupled to the output voltage terminal 314 and the collector of the transistor 332 is coupled to the anode of a diode 334. The cathode of the diode 334 is coupled to the control terminal 316 of the portable computer interface 312.

When the load current received by the docking station 302 from the power adapter 304 is less than or equal to the throttle current threshold used by the docking station 302, the output voltage of the docking station current sense op amp 322 is such that the voltage developed across the emitter and the base of the transistor 332 is insufficient to turn the transistor 332 on. When the load current received by the docking station 302 from the power adapter 304 is greater than the throttle current threshold used by the docking station 302, the output voltage of the docking station current sense op amp 322 is such that the voltage developed across the emitter and the base of the transistor 332 is sufficient to turn the transistor 332 on. The current that flows from the emitter to the collector of the transmitter 332 is output on the control terminal 316 as the control signal. In such an embodiment, the docking station control signal circuit 318 is configured so that when the transistor 332 turns on, the current flowing from the emitter to the collector of the transistor 332 (that is, the control signal) is proportional to the voltage output by the docking station current sense op amp 322, which is proportional to the amount by which the load current received by the docking station 302 from the power adapter 304 exceeds the throttle current threshold for the docking station 304.

In the particular embodiment shown in FIG. 3, the control terminal 310 of the adapter interface 306 is coupled to the control terminal 316 of the portable computer interface 312 over a control signal line 309 (though in FIG. 3. the power adapter 304 does not include a control terminal over which a control signal is output). In such an embodiment, the control signal output by the docking station control signal circuit 318 is also coupled to the control terminal 316 of the portable computer interface 312 over the control signal line 309.

The portable computer 106 uses the control signal output by the docking station 302 in order to control the amount of power used by the portable computer 106 in the manner described above in connection with FIG. 1. The portable computer 106, by using the control signal, controls the amount of power used by the portable computer 106 based on the total amount of power received by docking station 302 from the power adapter 304. However, the docking station 302, in the embodiment shown in FIG. 3, uses the same throttle current threshold for all power adapters that are coupled to the docking station 302, regardless of how much power any particular power adapter is actually capable of outputting. In other words, the docking station 302, in such an embodiment, assumes that all power adapters are capable of outputting the same amount of power.

In the particular embodiment shown in FIG. 3, the device interface 312 is coupled to the adapter interface 174 of the power computer 106, which is also used to couple the portable computer 106 directly to the power adapter 102. In other embodiments and implementations, the portable computer 106 comprises a separate interface (for example, a "docking station interface") for coupling the portable computer 106 to the device interface 312 of the docking station 302.

Figure 4A:
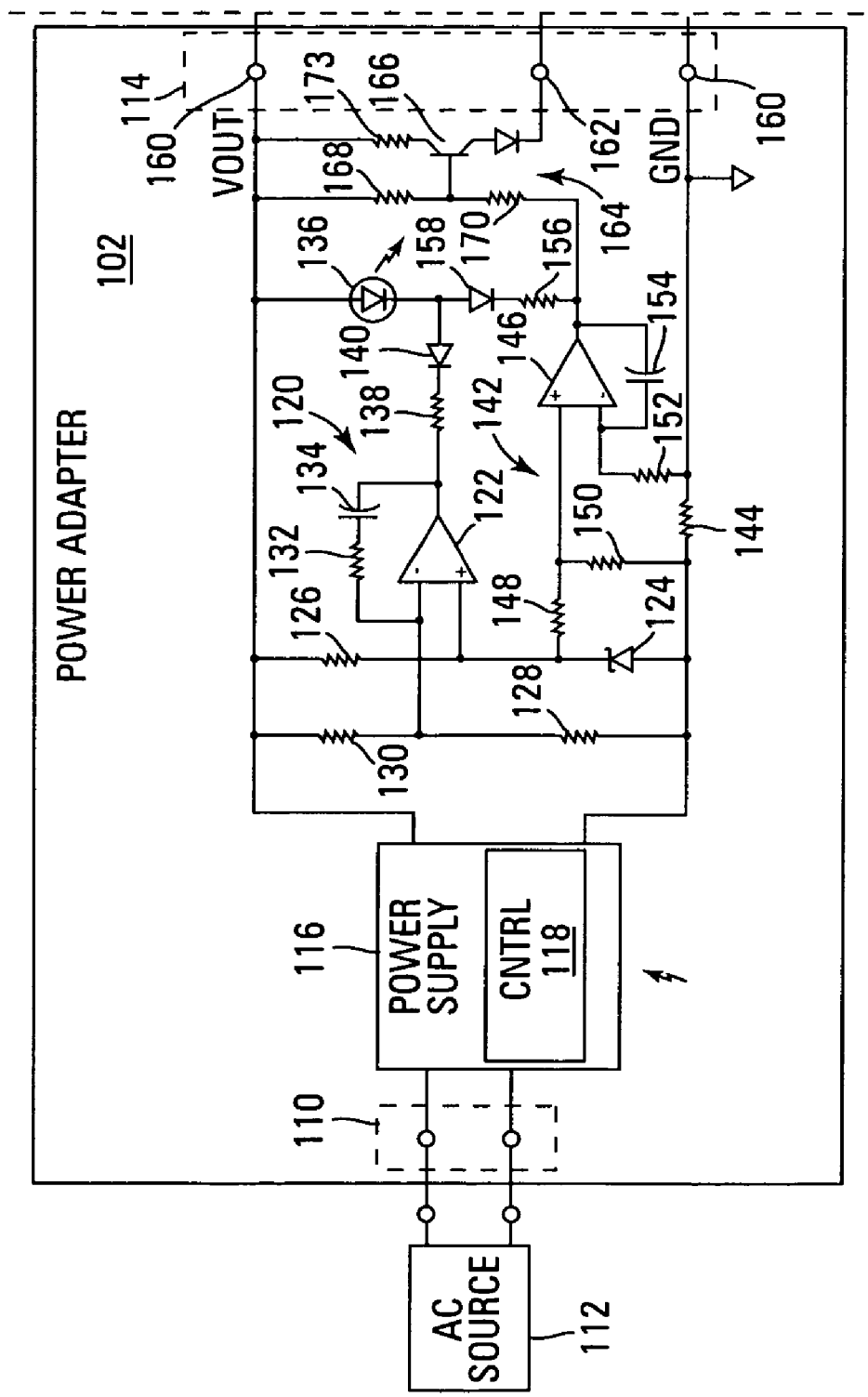

As noted above, the docking station 302 can be used with a power adapter that outputs a control signal (for example, the power adapter 102 of FIG. 1). FIG. 4 illustrates one such embodiment. FIG. 4 is a block diagram of one embodiment of a computing system 400. In the embodiment shown in FIG. 4, the portable computer 106 of FIG. 1 is inserted into or is otherwise coupled to the docking station 302 of FIG. 3 and the portable computer 106, the docking station 302, and any devices coupled to the portable computer 106 or the docking station 302 are powered by the power adapter 102 of FIG. 1.

In the embodiment shown in FIG. 4, the control terminal 162 of the power adapter's device interface 114 is coupled to the control terminal 310 of the docking station's adapter interface 306 and, as noted above, the control terminal 310 of the adapter interface 306 is coupled to the control terminal 316 of the docking station's portable computer interface 312 over the control signal line 309. In such an embodiment, both the control signal circuit 164 of the power adapter 102 and the docking station control signal circuit 318 of the docking station 302 output a control signal if and when the respective throttle current threshold for each circuit is exceeded. The portable computer 106 uses any control signal received from the docking station 302 to control the amount of power used by the portable computer 106 in the manner described above in connection with FIG. 1.

In an implementation where the throttle current threshold for the docking station control signal circuit 318 is lower than the control signal circuit 164 of the power adapter 102, the docking station control signal circuit 318 will output a control signal when the load current received by the docking station 302 exceeds the throttle current threshold for that circuit 318, which causes the portable computer 106 to reduce the amount of power it uses. Consequently, in such an implementation, the control signal circuit 164 of the power adapter 102 typically will not output a control signal because the control signal output by the docking station control signal circuit 318 will typically prevent the load current output by the power adapter 102 from exceeding the throttle current threshold for the power adapter 102.

In an implementation where the throttle current threshold for the control signal circuit 164 of the power adapter 102 is lower than the docking station control signal circuit 318, the control signal circuit 164 of the power adapter 102 will output a control signal when the load current output by the power adapter 102 exceeds the throttle current threshold for the power adapter 102, which causes the portable computer 106 to reduce the amount of power it uses. Consequently, in such an implementation, the docking station control signal circuit 318 typically will not output a control signal because the control signal output by the control signal circuit 164 of the power adapter will typically prevent the load current received by the docking station 302 from exceeding the throttle current threshold for the docking station control signal circuit 318. In other embodiments and implementations, the throttle current threshold for the control signal circuit 164 of the power adapter 102 is the same as the throttle current threshold for the docking station control signal circuit 318 or the throttle current threshold for the control signal circuit 164 of the power adapter 102 is higher than the throttle current threshold for the docking station control signal circuit 318.

Figure 5:
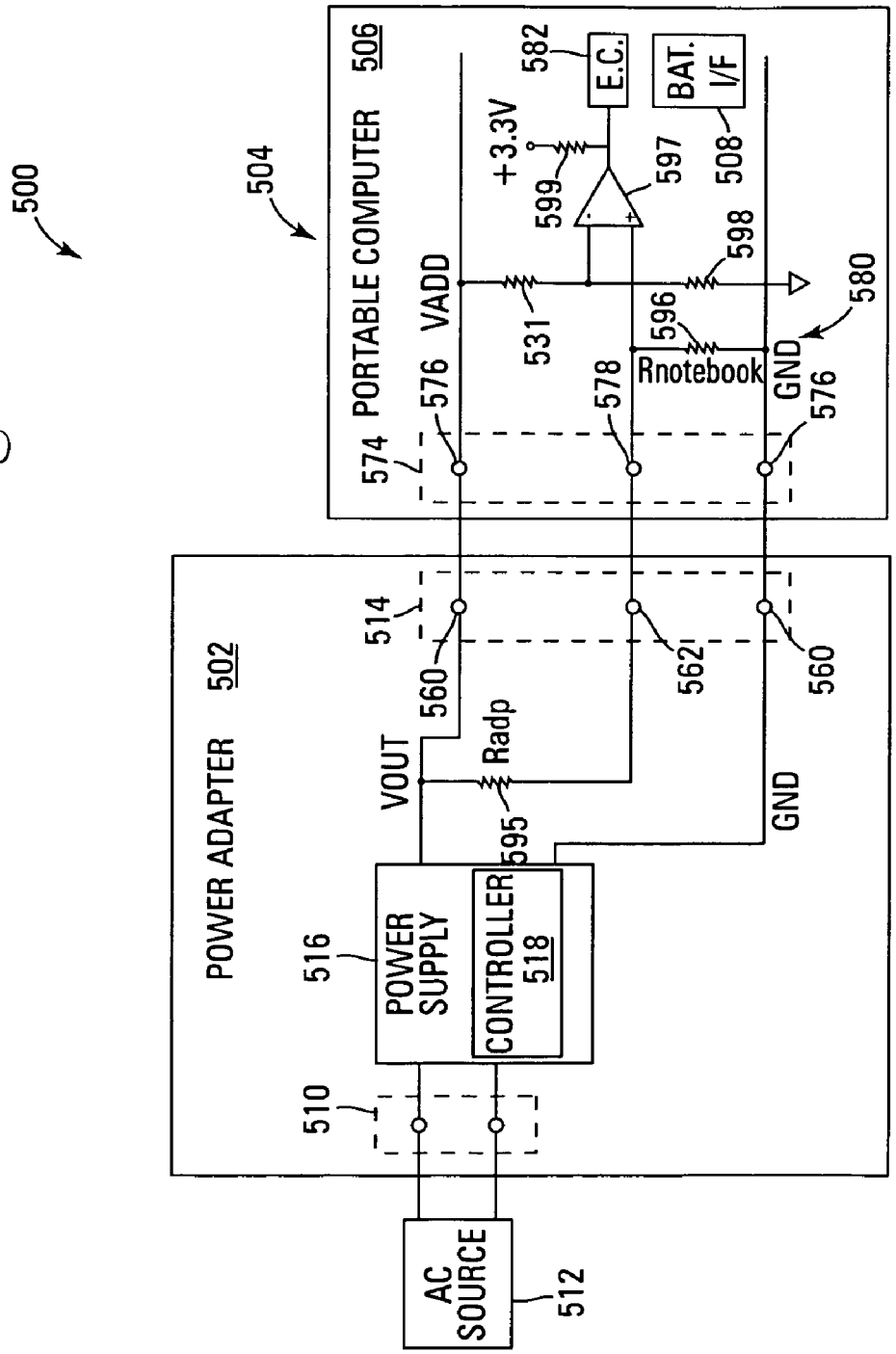
FIG. 5 is a high-level block diagram of one exemplary embodiment of a computing system in accordance with the invention.

In other embodiments, a control terminal included in a device interface of a power adapter on which a control signal (or other information indicative of an amount of load current output by a power adapter) may be output is used for identifying one or more attributes of the power adapter. For example, in one such embodiment, the control terminal is used by a powered device coupled to the power adapter to determine if the power rating of the power adapter is equal to or greater than the power rating of the powered device (that is, the minimum amount of power required by the powered device). FIG. 5 illustrates one such embodiment.

FIG. 5 is a high-level block diagram of one embodiment of a computing system 500. The computing system 500 comprises a power adapter 502 that is used to power at least one powered device 504. In the particular embodiment shown in FIG. 5, the powered device 504 comprises a portable computer 506. The portable computer 506, in the embodiment shown in FIG. 5, can be powered by the power adapter 502 (when coupled thereto) or by a battery coupled to the portable computer 506 via a battery interface 508. In other embodiments, one or more other external devices that are communicatively coupled to the portable computer 506 (for example, a docking station or an external drive unit such as a CD, DVD, or floppy drive unit) are also powered by the power adapter 502. In some other embodiments, a power adapter is used to power other types of electronic devices such as other types of battery-powered devices.

The power adapter 502 comprises a power-source interface 510 that is used to couple the power adapter 502 to an AC power source 512 (such as an AC outlet). The power adapter 502 also comprises a device interface 514 that is used to couple the power adapter 502 to the powered device 504 (the portable computer 506 in the embodiment shown in FIG. 5). In one implementation of the embodiment shown in FIG. 5, the power adapter 502 is directly coupled to the power source 512 and to the portable computer 506 using appropriate cabling and connectors. In another embodiment, the power adapter 502 is coupled to the portable computer 506 indirectly via one or more intermediary devices such as a docking station.

The power adapter 502 also comprises a power supply 516 that converts an AC line voltage from the AC power source 512 to a lower DC voltage suitable for use by the portable computer 506. In the embodiment shown in FIG. 5, the power supply 516 is designed to output a particular nominal output voltage on the device interface 514 for use by the portable computer 506. The power supply 516 comprises any suitable power supply topology now known or later developed. In the embodiment shown in FIG. 5, the power supply 516 comprises a controller 518 that controls the voltage output by the power supply 516 (for example, based on the voltage and/or load current output by the power adapter 502).

The device interface 514 of the power adapter 502 comprises a pair of power terminals 560 that are used to provide power to the portable computer 506. In the particular embodiment shown in FIG. 5, the power terminals 560 include an output voltage terminal (VOUT) and a ground terminal (GND). The device interface 514 further comprises a control terminal 562. In the embodiment shown in FIG. 5, the control terminal 562 is coupled to VOUT via a pull-up resistor 595 (also referred to here as "resistor Radp" or just "Radp").

At least one of the powered devices 504 powered by the power adapter 502 comprises an adapter interface that is used to couple the powered device 504 to the power adapter 502. In the embodiment shown in FIG. 5, the portable computer 506 comprises an adapter interface 574. The adapter interface 574 comprises a pair of power terminals 576 that are used to receive power from the power adapter 502 via the power terminals 560 of the power adapter's device interface 514. In the particular embodiment shown in FIG. 5, the power terminals 576 include an input voltage terminal (VADP) and a ground terminal (GND) that are coupled to the output voltage terminal VOUT and the ground terminal GND, respectively, of the power adapter's device interface 514.

The adapter interface 574 further comprises a control terminal 578 that is coupled to the control terminal 562 of the device interface 514 of the power adapter 502 when the power adapter 502 is coupled to the portable computer 506. The control terminal 578 of the portable computer 506 is used as an input to an identification circuit 580 that identifies one or more attributes of any power adapter 502 coupled to the portable computer 506. In the particular embodiment shown in FIG. 5, the identification circuit 580 identifies whether the power adapter 502 has a power rating that is greater than or equal to a particular "full-power power rating" associated with the portable computer 506. In such an embodiment, the full-power power rating is the amount of power needed by the portable computer 506 to be operated in a full-power mode. In one implementation of such an embodiment, the full-power mode is a mode in which the portable computer 506 is operated without degrading the performance of the portable computer 506 (for example, without reducing clock frequency at which a CPU is operated). In another implementation, the full-power mode is an operational mode in which a user is able to use the portable computer 506 (as opposed to a sleep mode in which battery charging occurs but the user is not otherwise able to use the portable computer 506).

In the embodiment shown in FIG. 5, the identification circuit 580 comprises a pull-down resistor 596 (also referred to here as "resistor Rnotebook" or just "Rnotebook") that couples the control terminal 578 to ground. When the power adapter 502 is coupled to the portable computer 506, the pull-up resistor 595 of the power adapter 502 and the pull-down resistor 596 of the portable computer 506 form a voltage divider. The voltage developed at the node formed between the pull-up resistor 595 and the pull-down resistor 596 (that is, at the control terminal 578) is used by the identification circuit 580 to determine if the power rating of the power adapter 502 is equal to or greater than the full-power power rating of the portable computer 506.

In the embodiment shown in FIG. 5, the portable computer 506 further comprises a comparator 597 that compares the voltage developed at the control terminal 578 to a reference voltage. The voltage developed at the control terminal 578 (that is, the voltage developed at the node formed between the pull-up resistor 595 and the pull-down resistor 596) is coupled to the non-inverting input of the comparator 597 and the reference voltage is coupled to the inverting input of the comparator 597. The voltage developed at the control terminal 578 is indicative of the ratio of the resistance value of Radp and the resistance value of Rnotebook. In the particular embodiment shown in FIG. 5, the reference voltage is developed at a node formed between a first bias resistor 531 and a second bias resistor 598. The first and second bias resistors 531 and 598 are coupled in series between VADP and ground. The voltage developed at the node between the first and second bias resistors 531 and 598 (that is, the reference voltage) is indicative of the ratio of the resistance value of the first resistor 531 and the resistance value of the second resistor 598. The output voltage of the comparator 597 is coupled to a logic voltage level (VDD) via a resistor 599. The output voltage of the comparator 597 is indicative of the difference between the voltage developed at the control terminal 578 and the reference voltage. With such an approach, variations in VADP are "cancelled" out of the comparison performed by the comparator 597.

In one exemplary implementation of such an embodiment, the bias resistors 598 are configured so that the reference voltage is just under one-half of VADP. In such an implementation, if the pull-up resistor 595 of the power adapter 502 is less than or equal to the pull-down resistor 596 of the portable computer 506, the comparator 597 outputs a logic "high" signal. If the pull-up resistor 595 of the power adapter 502 is greater than the pull-down resistor 596 of the portable computer 506, the comparator 597 outputs a logic "low" signal. In such an implementation, the pull-up resistor 595 of the power adapter 502 and the pull-down resistor 596 of the portable computer 506 are selected so that the pull-up resistor 595 is less than or equal to the pull-down resistor 596 of the portable computer 506 if the power rating of the power adapter 502 is equal to or greater than the full-power power rating of the portable computer 506, and that the pull-up resistor 595 of the power adapter 502 is greater than the pull-down resistor 596 of the portable computer 506 if the power rating of the power adapter 502 is less than the full-power power rating of the portable computer 506.

In the particular embodiment of FIG. 5, the portable computer 506 further comprises an embedded controller 582 to which the output of the comparator 597 is output. In such an embodiment, when the power adapter 502 is initially coupled to the portable computer 506, the embedded controller 582 detects that fact (for example, because power is being supplied on the adapter interface 574 of the portable computer 506) and checks the output of the comparator 597. In the exemplary implementation described in the previous paragraph, if the output of the comparator 597 has a logic high value, the embedded controller 582 learns that the power rating of the power adapter 502 is equal to or greater than the power rating of the portable computer 506. If the output of the comparator 597 has a logic low value, the embedded controller 582 learns that the power rating of the power adapter 502 is less than the power rating of the portable computer 506. In one such implementation, when the embedded controller 582 learns that the power rating of the power adapter 502 is greater than or equal to the power rating of the portable computer 506, the embedded controller 582 operates the portable computer 506 in a "full-power mode." When the embedded controller 582 learns that the power rating of the power adapter 502 is less than the power rating of the portable computer 506, the embedded controller 582 does not allow the portable computer 506 to operate in the full-power mode and, instead, operates the portable computer 506 in a "low-power mode" (for example, where a CPU included in the portable computer 506 is operated at a lower clock frequency). In one such implementation, the embedded controller 582 notifies a user of the portable computer 506 that the portable computer 506 is operating in low-power mode. In other embodiments and implementations, other actions are taken in the event that the portable computer 506 learns that the power rating of the power adapter 502 is less than the full-power power rating of the portable computer 506. For example, in one such other implementation, when the embedded controller 582 learns that the power rating of a power adapter 502 is less than the full-power power rating of the portable computer 506, the embedded controller 582 may operate the portable computer 506 in a sleep mode in which battery charging occurs but a user is not otherwise able to use the portable computer 506. In one example of such an implementation, the power adapter 502 comprises a small "travel" adapter that has a power rating sufficient for battery charging but not sufficient for the portable computer 506 to operate in full-power mode.

FIG. 6 is a chart 600 illustrating exemplary values of Radp and Rnotebook for various power ratings in one implementation of the system 500 of FIG. 5. Each row of the chart 600 corresponds to a given power rating in Watts. The column labeled Radp in chart 600, for each row of the chart 600, contains a resistor value (in Kiloohms) for resistor Radp that is associated with a power adapter 502 having the power rating associated with that row. The column labeled Rnotebook in chart 600, for each row of the chart 600, contains a resistor value for resistor Rnotebook that is associated with a portable computer 506 having the full-power power rating associated with that row. In the particular example shown in chart 600, the resistor values are configured for a reference voltage that is thirty percent of VADP.

For example, in one implementation designed in accordance with chart 600, a first power adapter 502 having a power rating of 65 Watts comprises a 383 Kiloohm pull-up resistor 595 (Radp), a second power adapter 502 having a power rating of 50 Watts comprises a 499 Kiloohm pull-up resistor 595 (Radp), and a portable computer 506 having a full-power power rating of 65 Watts comprises a 191 Kiloohm pull-down resistor 596 (Rnotebook). If the first power adapter 502 (with a Radp having a resistance of 383 Kiloohms) is coupled to the portable computer 506 (with a Rnotebook having a resistance of 191 Kiloohms), the comparator 597 of the portable computer 506 outputs a logic high value indicating that the power rating of that power adapter 502 is equal to or greater than the full-power power rating of the portable computer 506. If the second power adapter 502 (with a Radp having a resistance of 499 Kiloohms) is coupled to the portable computer 506 (with a Rnotebook having a resistance of 191 Kiloohms), the comparator 597 of the portable computer 506 outputs a logic low value indicating that the power rating of that power adapter 502 is less than the full-power power rating of the portable computer 506. In the latter situation, the embedded controller 582 of the portable computer 506, for example, could operate the portable computer 506 in a low-power mode.

FIG. 7 is a chart 700 illustrating the voltage difference between the two inputs of the comparator 597 of a portable computer 506 implemented using chart 600 of FIG. 6 when a power adapter 502 implemented using chart 600 of FIG. 6 is directly coupled to the portable computer 506. Each row of the chart 700 corresponds to a power adapter 502 comprising a pull-up resistor 595 having a resistance value from the intersection of the respective row and column of chart 600. Each column of the chart 700 corresponds to a portable computer 506 comprising a pull-down resistor 596 having a resistance value from the intersection of the respective row and column of chart 600. For example, in such an implementation, where a power adapter 502 having a power rating of 50 Watts (with a Radp having a resistance of 499 Kiloohms) is coupled to a portable computer 106 having a full-power power rating of 65 Watts (with a Rnotebook having a resistance of 191 Kiloohms), the voltage difference between the two inputs of the comparator 597 of the portable computer 506 is −0.54 Volts, which results in the comparator 597 outputting a logic low value.

Figure 8:
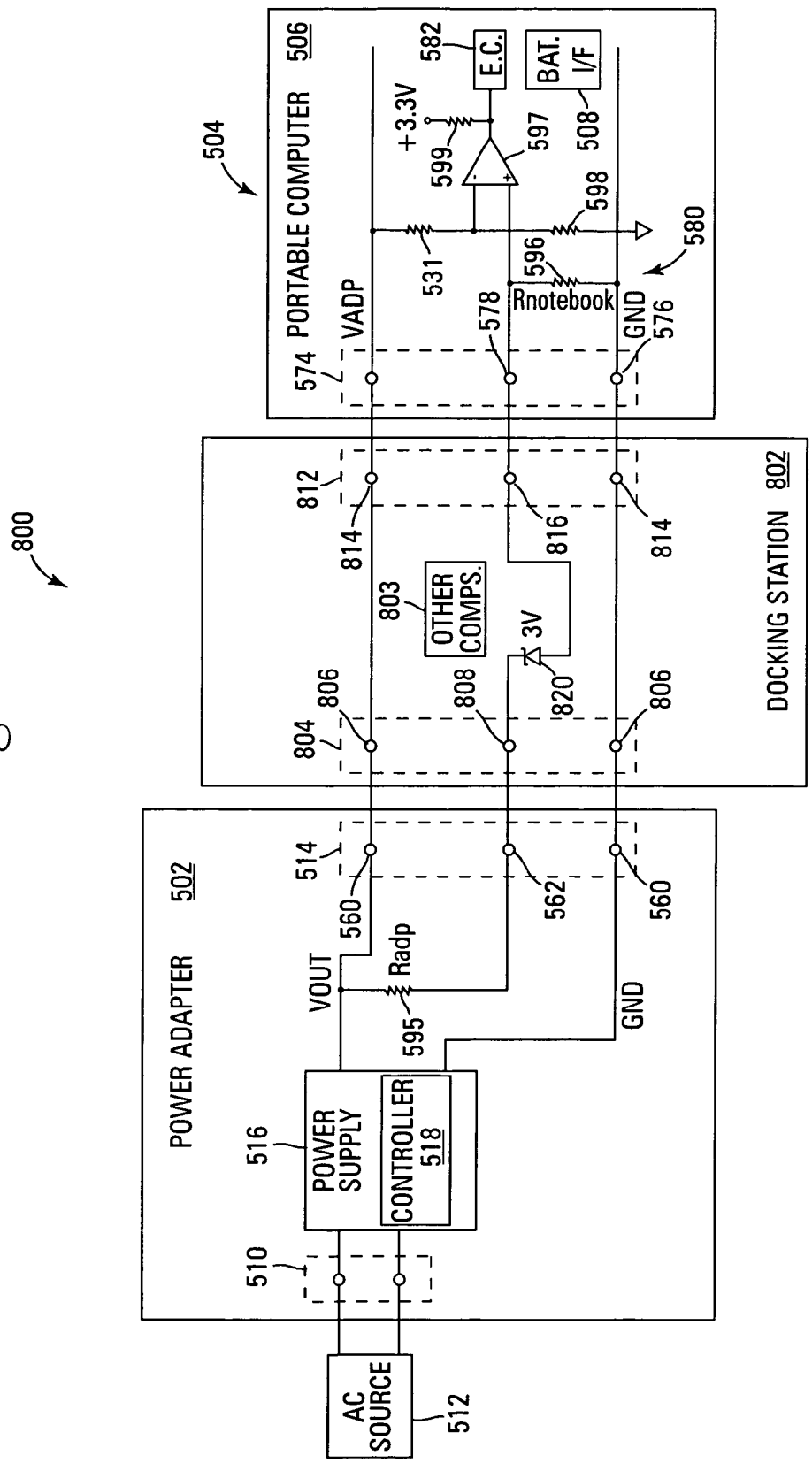
FIG. 8 is a block diagram of one exemplary embodiment of a computing system in accordance with the invention.

The power adapter 502 is shown in FIG. 5 as being directly coupled to the portable computer 506. In other usage scenarios, the power adapter 502 is coupled to the portable computer 506 via one or more intermediary devices such as a docking station. In some embodiments, such an intermediary device consumes at least a portion of the power supplied by the power adapter 502. FIG. 8 illustrates one such usage scenario.

FIG. 8 is a block diagram of one embodiment of a computing system 800. In the embodiment shown in FIG. 8, the portable computer 506 of FIG. 5 is inserted into or is otherwise coupled to a docking station 802 and the portable computer 506, the docking station 802, and any devices coupled to the portable computer 506 or the docking station 802 are powered by the power adapter 502 of FIG. 5. The docking station 802, in the embodiment shown in FIG. 8, includes an adapter interface 804 that is used to couple the docking station 802 to the power adapter 502. The adapter interface 804 of the docking station 802 comprises a pair of power terminals 806 that are used to receive power from the power adapter 502 via the power terminals 560 of the power adapter's device interface 514. In the particular embodiment shown in FIG. 8, the power terminals 806 of the adapter interface 804 include an input voltage terminal and a ground terminal that are coupled to the output voltage terminal VOUT and the ground terminal GND, respectively, of the power adapter's device interface 514. The adapter interface 804, in the embodiment shown in FIG. 8, comprises a control terminal 808 that is coupled to the control terminal 562 of the power adapter 502 when the docking station 802 is coupled to the power adapter 502.

The docking station 802 further comprises a device interface 812 (also referred to here as the "portable computer interface" 812) that is used to couple the docking station 802 to the portable computer 506. The portable computer interface 812 comprises a pair of power terminals 814. In the embodiment shown in FIG. 8, the pair of power terminals 814 comprises an output voltage terminal and a ground terminal. The output voltage terminal and the ground terminal of the portable computer interface 812 of the docking station 802 are coupled to the input voltage terminal VADP and the ground terminal GND of the portable computer's adapter interface 574. In the embodiment shown in FIG. 8, the device interface 812 is shown as being coupled to the adapter interface 574. The portable computer interface 812, in the embodiment shown in FIG. 8, further comprises a control terminal 816 that is coupled to the control terminal 578 of the portable computer 506 when the docking station 802 is coupled to the portable computer 506.

In the embodiment shown in FIG. 8, power received on the power terminals 806 of the adapter interface 804 is used to power one or more components 803 (for example, one or more light-emitting diodes) included in the docking station 802. Also, in the embodiment shown in FIG. 8, power received on the power terminals 806 of the adapter interface 804 is used to power the portable computer 506 coupled to the docking station 802 and any number of other external devices (for example, external drive units such as an external floppy, hard disk, CD, or DVD drive or external input devices such as external keyboards or pointing devices).

In the embodiment shown in FIG. 8, the control terminal 808 of the adapter interface 804 is coupled to the control terminal 816 of the portable computer interface 816 via a Zener diode 820. When the power adapter 502 is coupled to the adapter interface 804 of the docking station 802 and the portable computer 506 is coupled to the portable computer interface 812 of the docking station 802, the control terminal 562 of the power adapter 502 is coupled to the control terminal 578 of the portable computer 506 via the Zener diode 820 of the docking station 802. The Zener diode 820 provides a fixed voltage drop (for example, 3 Volts) from the control terminal 808 of the adapter interface 804 to the control terminal 816 of the portable computer interface 812. As result, the voltage developed at the node formed between the pull-up resistor 595 and the pull-down resistor 596 is lower than the voltage developed at the node formed between the pull-up resistor 595 and the pull-down resistor 596 when the power adapter 502 is directly coupled to the portable computer 506. In other embodiments and implementations, a fixed voltage drop is provided from the control terminal 808 of the adapter interface 804 to the control terminal 816 of the portable computer interface 812 in other ways (for example, using a two-terminal reference voltage integrated circuit).

In one implementation of such an embodiment implemented using the chart 600 of FIG. 6, the system 800 is configured so that when the power adapter 502 is coupled to the adapter interface 804 of the docking station 802 and the portable computer 506 is coupled to the portable computer interface 812 of the docking station 802, the voltage drop caused by the Zener diode 820 is sufficient to cause the power adapter 502 to appear to the portable computer 506 as a power adapter having the next lowest power rating in chart 600. For example, when a power adapter 502 having a power rating of 135 Watts (and comprising a pull-up resistor 595 having a resistance of 169 Kilohms) is coupled to the docking station 802, the power adapter 502 appears to a portable computer 506 coupled to the docking station 802 as a power adapter having a power rating of 120 Watts due to the voltage drop caused by the Zener diode 820. In this way, the amount of power consumed by the docking station 802 is taken into account by the portable computer 506 when determining if the power adapter 502 is able to provide enough power to operate the portable computer 506 in full-power mode.

FIG. 9 is a chart 900 illustrating the voltage difference between the two inputs of the comparator 597 of a portable computer 506 implemented using chart 600 of FIG. 6 when a power adapter 502 implemented using chart 600 of FIG. 6 is coupled to the portable computer 506 via the docking station 802 of FIG. 8.

In the embodiment shown in FIG. 5, the portable computer 506 is configured to compare the voltage developed at the control terminal 578 to one reference voltage. In other embodiments, the voltage developed at the control terminal 578 is compared to multiple references voltages. FIG. 10 illustrates one such embodiment.

FIG. 10 is a block diagram of one embodiment of a computing system 1000. In the embodiment shown in FIG. 10, the power adapter 502 of FIG. 5 is coupled to a portable computer 1006. The portable computer 1006 of FIG. 10 is similar to the portable computer 506 of FIG. 5 and similar components are referenced in FIG. 10 using the same reference numerals used in FIG. 5 for those components.

The portable computer 1006 of FIG. 10 comprises a first comparator 1004 that compares the voltage developed at the control terminal 578 to a first reference voltage. The portable computer 1006 further comprises a second comparator 1005 that compares the voltage developed at the control terminal 578 to a second reference voltage. In such an embodiment, the first reference voltage is indicative of a particular "full-power" power rating associated with the portable computer 1006. In such an embodiment, the full-power power rating is the amount of power needed by the portable computer 1006 to be operated in a full-power mode. The voltage developed at the control terminal 578 is coupled to the non-inverting input of the first comparator 1004 and the first reference voltage is coupled to the inverting input of the first comparator 1004. In such an embodiment, the second reference voltage is indicative of a particular "minimum" power rating associated with the portable computer 1006. In such an embodiment, the minimum power rating is the minimum amount of power needed by the portable computer 1006 to be operated in a low-power mode. The voltage developed at the control terminal 578 is coupled to the non-inverting input of the second comparator 1005 and the second reference voltage is coupled to the inverting input of the second comparator 1005.

The portable computer 1006 comprises a first, second, and third resistors 1008, 1010, and 1012, respectively that are coupled in series between VADP and ground. The first reference voltage is developed at the node between the first and second resistors 1008 and 1010 and the second reference voltage is developed at the node between the second and third resistors 1010 and 1012. The output voltage of the first comparator 1004 is coupled to a logic voltage level (VDD) via a resistor 1014. The output voltage of the first comparator 1004 is indicative of the difference between the voltage developed at the control terminal 578 and the first reference voltage. The output voltage of the second comparator 1005 is coupled to a logic voltage level (VDD) via a resistor 1016. The output voltage of the second comparator 1005 is indicative of the difference between the voltage developed at the control terminal 578 and the second reference voltage.

In the embodiment shown in FIG. 10, the system 1000 is configured so that when a power adapter 502 having a power rating that is less than the minimum power rating associated with the second reference voltage (and a pull-up resistor 595 having an corresponding resistance value) is coupled to the portable computer 1006, both the first and second comparators 1004 and 1005 output a logic low value. Moreover, the system 1000 is configured so that when a power adapter 502 having a power rating that is greater than or equal to the minimum power rating associated with the second reference voltage but less than the full-power power rating associated with the first reference voltage is coupled to the portable computer 1006, the first comparator 1004 outputs a logic low value and the second comparator 1005 outputs a logic high value. In such an embodiment, the system 1000 is configured so that when a power adapter 502 having a power rating that is greater than or equal to the maximum power rating associated with the first reference voltage is coupled to the portable computer 1006, both the comparators 1004 and 1005 output a logic high value.

In the particular embodiment of FIG. 10, the portable computer 1006 further comprises an embedded controller 1082 to which the output of the first and second comparators 1004 and 1005 are output. In such an embodiment, when the power adapter 502 is initially coupled to the portable computer 1006, the embedded controller 1082 detects that fact (for example, because power is being supplied on the adapter interface 574 of the portable computer 1006) and checks the outputs of the first and second comparators 1004 and 1005. In the embodiment shown in FIG. 10, if both comparators 1004 and 1005 output a logic high value, the embedded controller 1082 learns that the power rating of the power adapter 502 is equal to or greater than the full-power power rating associated with the portable computer 1006. In such a situation, the embedded controller 1082 operates the portable computer 1006 in the full-power mode.

If the first comparator 1004 outputs a logic low value but the second comparator 1005 outputs a logic high value, the embedded controller 1082 learns that the power rating of the power adapter 502 is equal to or greater than the minimum power rating associated with the portable computer 1006 but is less than the full-power power rating associated with portable computer 1006. In such a situation, the embedded controller 1082 may operate the portable computer 1006 in a low-power mode (for example, where a CPU included in the portable computer 1006 is operated at a lower clock frequency).

If both the comparators 1004 and 1005 output a logic low value, the embedded controller 1082 learns that the power rating of the power adapter 502 is less than the minimum-power power rating associated with the portable computer 1006. In such a situation, the embedded controller 1082 may power off the portable computer 1006 (for example, by having the portable computer 1006.enter a "sleep" state in which battery charging occurs but the user is not otherwise able to use the portable computer 1006).

Figure 11:
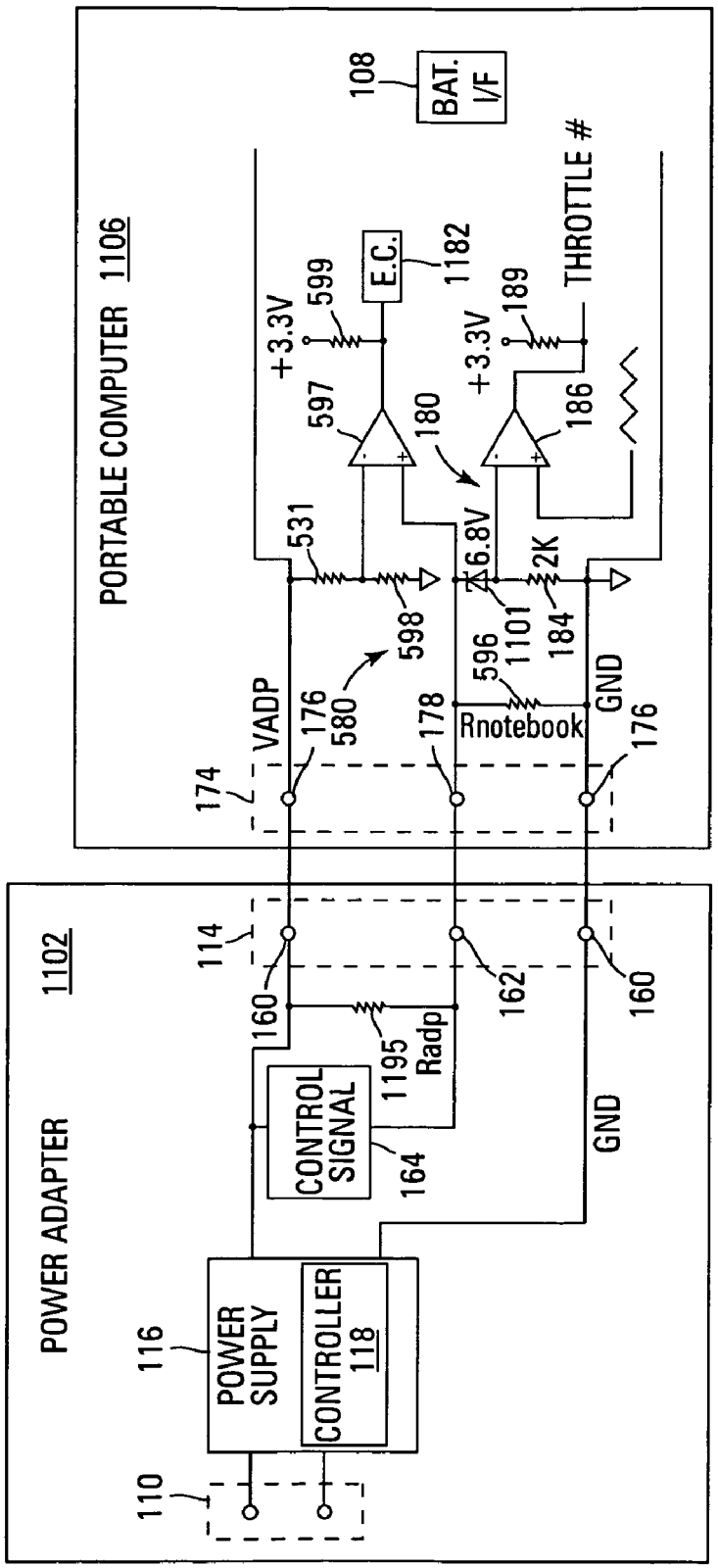
FIG. 11 is a block diagram of one exemplary embodiment of a computing system in accordance with the invention.

FIG. 11 is a block diagram of one embodiment of a computing system 1100. In the embodiment shown in FIG. 11, a power adapter 1102 is directly coupled to the portable computer 1106 (though in other embodiments, the power adapter 1102 is coupled to the portable computer 1106 via one or more intermediary devices such as the docking station 802 of FIG. 8). Except as described here, the power adapter 1102 and the portable computer 1106 are similar to the power adapter 102 and portable computer 106 of FIG. 1, respectively, and similar components are referenced in FIG. 11 using the same reference numerals used in FIG. 1 for those components. The power adapter 1102 comprises a pull-up resistor 1195 (also referred to here as "resistor Radp" or just "Radp") coupled across VOUT and the control terminal 162 of the adapter interface 114 of the power adapter 1102 in parallel with the control signal circuit 164. The pull-up resistor 1195 of the power adapter 1102, in the embodiment shown in FIG. 11, has a resistance value that is much larger than the resistor 184 used in the throttle signal circuit 180 of the portable computer 1106 to couple the control signal 178 to ground. In one implementation of such an embodiment, the resistor 184 has a resistance value of 2 Kiloohms and the pull-up resistor 1195 has a resistance value that is much larger than 2 Kiloohms.

In the embodiment shown in FIG. 11, the portable computer 1106 comprises both the throttle signal circuit 180 and an identification circuit 580 similar to the identification circuit 580 of FIG. 5 (and similar components are referenced in FIG. 11 using the same reference numerals used in FIG. 5 for such components). In such an embodiment, the non-inverting input of the comparator 186 of the throttle signal circuit 180 is coupled to the control terminal 178 of the portable computer 1106 using a Zener diode 1101 having a voltage drop of, for example, 6.8 Volts. Also, in such an embodiment, the sawtooth wave used by the throttle signal circuit 180 has a DC offset (for example, a sawtooth wave having a 1.0 Volt DC offset and a maximum amplitude of 2.0 Volts). When the power adapter 1102 is coupled to the portable computer 1106, at first, the control signal output by the control signal circuit 164 of the power adapter 1102 is zero. Because the pull-up resistor 1195 is much larger than the resistor 184, the current through the pull-up resistor 1195 will be insufficient to generate current on the control terminal 178 sufficient to "turn on" the throttle signal circuit 180. The Zener diode 1101 used to couple the throttle signal circuit 180 to the control terminal 178 of the portable computer 1106 does not affect the identification circuit 580 since the voltage developed at the control terminal 178 is well less than the Zener voltage of the Zener diode 1101.

In such an embodiment, the output of the identification circuit 580 is checked by an embedded controller 1182 of the portable computer 1106 when the power adapter 1102 is first coupled to the portable computer 1106. The control signal circuit 164 of the power adapter 1102 typically does not output the control signal during this time because the load current output by the power adapter 1102 typically does not rise above the throttle current threshold during this time or because the response time of the control signal circuit 164 is long enough that the control signal circuit 164 will not react (and output a control signal) during this time. After the embedded controller 1182 of the portable computer 1106 reads the output of the identification circuit 580 (and determines whether or not to operate the portable computer in full-power mode as described above in connection FIG. 5), the embedded controller 1182 need not read the output of the identification circuit 580 again while the same power adapter 1102 is coupled to the portable computer 1106. Thereafter, the amount of power used by the portable computer 1106 may be controlled using information indicative of the amount of power output by the power adapter 1102 (that is, using the control signal output by the control signal circuit 164) as described above in connection with FIG. 1.

Figure 12:
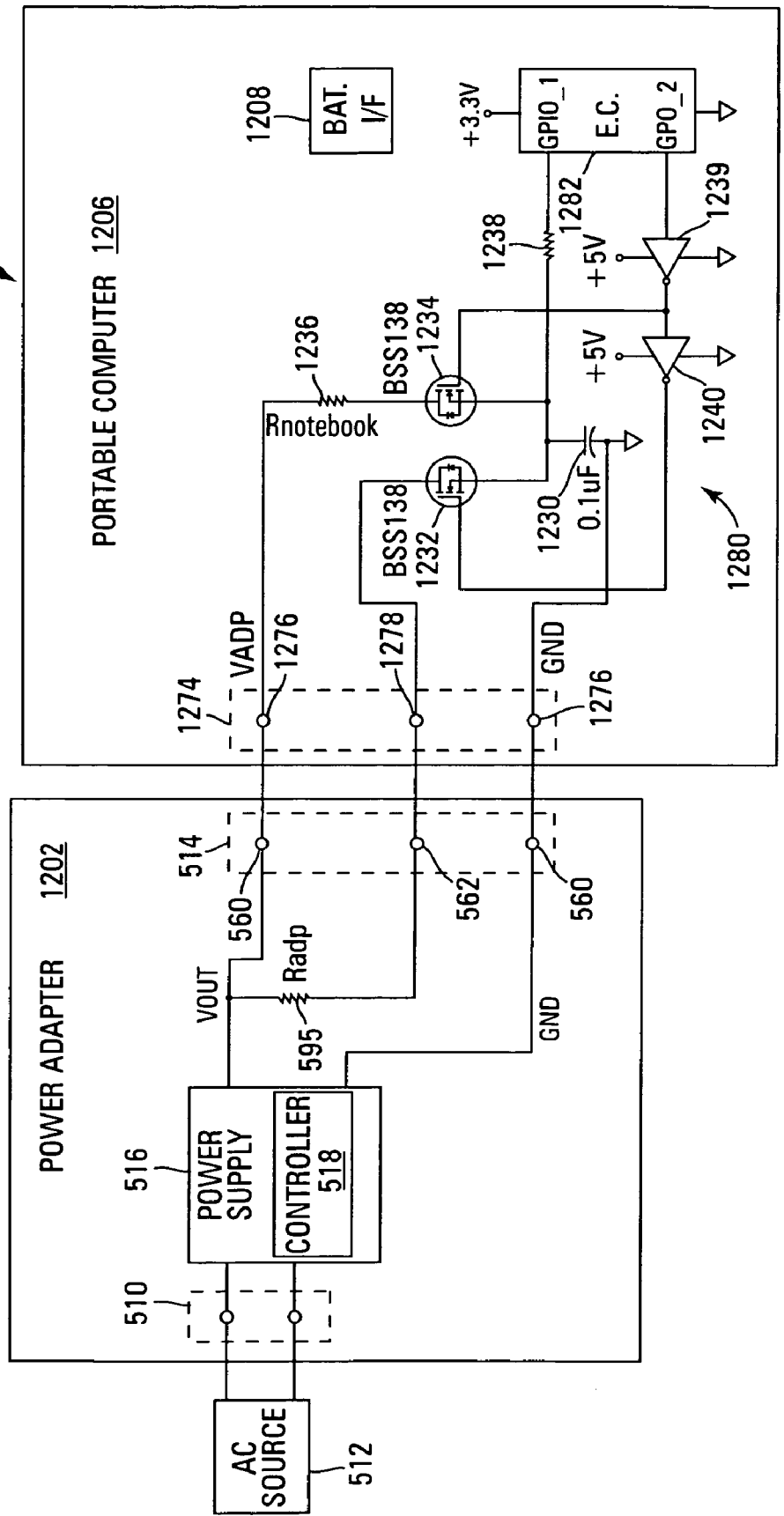
FIG. 12 is a block diagram of one exemplary embodiment of a computing system in accordance with the invention.

In other embodiments, a control terminal included in a device interface of a power adapter on which a control signal (or other information indicative of the amount of load current output by a power adapter) may be output is used for identifying one or more attributes of the power adapter in other ways. FIG. 12 illustrates one such embodiment.

FIG. 12 is a block diagram of one embodiment of a computing system 1200. The computing system 1200 comprises a power adapter 1202 that is used to power at least one powered device 1204. In the particular embodiment shown in FIG. 12, the powered device 1204 comprises a portable computer 1206. The portable computer 1206, in the embodiment shown in FIG. 12, can be powered by the power adapter 1202 (when coupled thereto) or by a battery coupled to the portable computer 1206 via a battery interface 1208. In other embodiments, one or more other external devices that are communicatively coupled to the portable computer 1206 (for example, a docking station or an external drive unit such as a CD, DVD, or floppy drive unit) are also powered by the power adapter 1202. In some other embodiments, a power adapter is used to power other types of electronic devices such as other types of battery-powered devices.

Except as described here, the power adapter 1202 is similar to the power adapter 502 of FIG. 5 and similar components are referenced in FIG. 12 using the same reference numerals used in FIG. 5 for those components. In the embodiment shown in FIG. 12, the resistor Radp is selected so that the resistance value of resistor Radp is indicative of the power rating of the power adapter 1202. In one exemplary implementation of such an embodiment, a set of power adapters 1202 having respective power ratings of 50 Watts, 65 Watts, 90 Watts, and 120 Watts comprise respective resistors Radp having resistance values of, for example, 50 Kiloohms, 75 Kiloohms, 100 Kiloohms, and 125 Kiloohms, respectively. That is, a power adapter 1202 having a power rating of 90 Watts, for example, has a resistor Radp having a resistance value of 100 Kiloohms. In other embodiments and implementations, other component values are used.

At least one of the powered devices 1204 powered by the power adapter 1202 comprises an adapter interface that is used to couple the powered device 1204 to the power adapter 1202. In the embodiment shown in FIG. 12, the portable computer 1206 comprises an adapter interface 1274. The adapter interface 1274 comprises a pair of power terminals 1276 that are used to receive power from the power adapter 1202 via the power terminals 560 of the power adapter's device interface 514. In the particular embodiment shown in FIG. 12, the power terminals 1276 include an input voltage terminal (VADP) and a ground terminal (GND) that are coupled to the output voltage terminal VOUT and the ground terminal GND, respectively, of the power adapter's device interface 514.

The adapter interface 1274 further comprises a control terminal 1278 that is coupled to the control terminal 562 of the device interface 514 of the power adapter 1202 when the power adapter 1202 is coupled to the portable device 1206. The control terminal 1278 of the portable computer 1206 is used as an input to an identification circuit 1280 that identifies one or more attributes of the power adapter 1202 coupled to the portable computer 1206. In the particular embodiment shown in FIG. 12, the identification circuit 1280 is used to identify a power rating associated with any power adapter 1202 coupled to the portable computer 1206. The identification circuit 1280 comprises a capacitor 1230. In one implementation of such an embodiment, the capacitor 1230 has a capacitance of 0.1 microfarads. The capacitor 1230 has a first terminal that is coupled to ground. The capacitor 1230 has a second terminal that is coupled to the control terminal 1278 of the portable computer 1206 via first transistor switch 1232. When the power adapter 1202 is coupled to the portable computer 1206, the control terminal 1278 is coupled to the control terminal 562 of the power adapter 1202, which in turn couples the capacitor 1230 to VOUT via the resistor Radp of the power adapter 1202. The second terminal of the capacitor 1230 is also coupled to VADP of the portable computer 1206 via a second transistor switch 1234 and a pull-up resistor 1236 (also referred to here as "resistor Rnotebook" or just "Rnotebook"). In one implementation, the first and second transistors 1232 and 1234 are implemented using respective BSS138 field-effect transistors.

The identification circuit 1280 is coupled to an embedded controller 1282. In the particular embodiment shown in FIG. 12, the embedded controller 1282 comprises an input/output terminal GPIO_1 and an output terminal GPO_2. The input/output terminal GPIO_1 of the embedded controller 1282 is coupled to the second terminal of the capacitor 1230 via a resistor 1238. In one implementation of such an embodiment, the resistor 1238 has a resistance value of 220 Ohms. The output terminal GPO_2 of the embedded controller 1282 is used to selectively couple the second terminal of the capacitor 1230 to VADP either via Radp of the power adapter 1202 by closing the first transistor 1232 (while the second transistor 1234 is open) or via Rnotebook of the portable computer 1206 by closing the second transistor 1234 (while the first transistor 1232 is open). In the embodiment shown in FIG. 12, the second transistor 1234 is closed (which electrically couples the second terminal of the capacitor 1230 to VADP via Rnotebook) and the first transistor 1232 is open (which electrically decouples the second terminal of the capacitor 1230 from Radp) when a "low" value is output by the embedded controller 1280 on the output terminal GPO_2. The gate of the second transistor 1234 is coupled to the output terminal GPO_2 of the embedded controller 1282 via a first inverting amplifier 1239 that amplifies the low signal output by the embedded controller 1282 on the output terminal GPO_2 to a suitable voltage (for example, 5 Volts) to turn on the second transistor 1234. The gate of the first transistor 1232 is coupled to the output of the first inverting amplifier 1239 via second inverting amplifier 1240. When the output of the output terminal GPO_2 is low, the second inverting amplifier 1240 applies an appropriate low-voltage value to the gate of the first transistor 1232 to open the first transistor 1232.

In the embodiment shown in FIG. 12, the second transistor 1234 is open (which electrically decouples the second terminal of the capacitor 1230 from Rnotebook) and the first transistor 1232 is closed (which electrically couples the second terminal of the capacitor 1230 to VADP via Radp) when a "high" value is output by the embedded controller 1280 on the output terminal GPO_2. In such a situation, the first inverting amplifier 1239 applies an appropriate low-voltage value to the gate of the second transistor 1234 to open the second transistor 1234 and the second inverting amplifier 1239 applies an appropriate high-voltage value to the gate of the first transistor 1232 to close the first transistor 1232.

The embedded controller 1282, in the embodiment shown in FIG. 12, runs an identification routine when the power adapter 1202 is first coupled to the portable computer 1206. The identification routine, in one implementation, comprises appropriate program instructions that are stored (or otherwise embodied) on an appropriate storage medium from which at least a portion of the program instructions are read by the embedded controller 1282 for execution thereby. When the power adapter 1202 is first coupled to the portable computer 1206, the embedded controller 1282 causes a low value to be output on the output terminal GPO_2, which closes the second transistor 1234 and opens the first transistor 1232. Closing the second transistor 1234 electrically couples the second terminal of the capacitor 1230 to VADP via resistor Rnotebook. During this time, the embedded controller 1282 outputs a low value on the input/output terminal GPIO_1, which causes the capacitor 1230 to be discharged through resistor 1238. After the capacitor 1230 has been fully discharged, the input/output terminal GPIO_1 is configured as an input, which causes the current flowing through Rnotebook charges the capacitor 1230. The embedded controller 1282 monitors the voltage at the input/output terminal GPIO_1 to determine how long (for example, using a timer and/or a counter) it takes for the voltage at the input/output terminal GPIO_1 to reach a logic high value (for example, 2.3 Volts). How long it takes for the voltage at the input/output terminal GPIO_1 to reach a logic high value is also referred to here as time Tnbk. The embedded controller 1282 saves the time Tnbk.

The embedded controller 1282 controller then causes a high value to be output on the output terminal GPO_2, which opens the second transistor switch 1234 and closes the first transistor 1232. Closing the first transistor switch 1232 electrically couples the second terminal of the capacitor 1230 to VADP via the resistor Radp. During this time, the embedded controller 1282 outputs a low value on the input/output terminal GPIO_1, which causes the capacitor 1230 to be discharged through resistor 1238. After the capacitor 1230 has been fully discharged, the input/output terminal GPIO_1 is configured as an input, which causes the current flowing through Radp charges the capacitor 1230. The embedded controller 1282 monitors the voltage at the input/output terminal GPIO_1 to determine how long (for example, using a timer and/or a counter) it takes for the voltage at the input/output terminal GPIO_1 to reach a logic high value (for example, 2.3 Volts). How long it takes for the voltage at the input/output terminal GPIO_1 to reach a logic high value is also referred to here as time Tadp. The embedded controller 1282 saves the time Tadp.

The embedded controller 1282, in the embodiment shown in FIG. 12, calculates a ratio of Tadp/Tnbk and uses that ratio Tadp/Tnbk to identify (or otherwise characterize) the power rating of the power adapter 1202. For example, in one implementation, the embedded controller 1282 uses a lookup table in which various Tadp/Tnbk ratios are stored. Each stored Tadp/Tnbk ratio is associated with a power adapter 1202 having a particular power rating. In such an implementation, the embedded controller 1282 compares the measured Tadp/Tnbk ratio to the Tadp/Tnbk ratios stored in the lookup table in order to determine which stored Tadp/Tnbk ratio the measured Tadp/Tnbk ratio matches. The embedded controller 1282, in such an implementation, assumes that the power adapter 1202 coupled to the portable computer 1206 has the power rating associated with the stored Tadp/Tnbk ratio that matches the measured Tadp/Tnbk ratio. The embedded controller 1282 is able to use the power rating of the power adapter 1202 to manage the operation of the portable computer 1206 while coupled to that power adapter 1202. In one exemplary implementation, if the power rating of the power adapter 1202 is greater than or equal to a full-power power rating associated with the portable computer 1206, the embedded controller 1282 operates the portable computer 1206 in a full-power mode. If the power rating of the power adapter 1202 is less than a full-power power rating associated with the portable computer 1206 but greater than or equal to a minimum power rating associated with the portable computer 1206, the embedded controller 1282, in such an exemplary implementation, operates the portable computer 1206 in a low-power mode. If the power rating of the power adapter 1202 is less than a minimum power rating associated with the portable computer 1206, the embedded controller 1282, in such an exemplary implementation, powers off the portable computer 1206 (for example, by having the portable computer 1206 enter a "sleep" state in which battery charging occurs but the user is not otherwise able to use the portable computer 1206).

The power adapter 1202 is shown in FIG. 12 as being directly coupled to the portable computer 1206. The identification technique described in connection 1200 can also be used to identify a power rating associated with any power adapter 1202 coupled to the portable computer 1206 via a docking station. The docking station provides a signal path between the control terminal 564 of the power adapter 1202 and the control terminal 1278 of the portable computer 1206 so that the identification circuit 1280 is able to identify the power rating of the power adapter 1202 coupled to the docking station as described above. The embedded controller 1282 is able to determine when the power adapter 1202 is coupled to the portable computer 1206 via a docking station and modify the manner in which the embedded controller 1282 manages the operation of the portable computer 1206 while coupled to that power adapter 1202 accordingly (for example, by taking into account the amount of power typically consumed by the docking station when determining if the power adapter 1202 is able to deliver sufficient power to operate the portable computer 1206 in full-power mode and/or low-power mode).

The identification circuit 1280, in other embodiments, is implemented in other ways. One such alternative embodiment is illustrated in FIG. 13.

Figure 13:
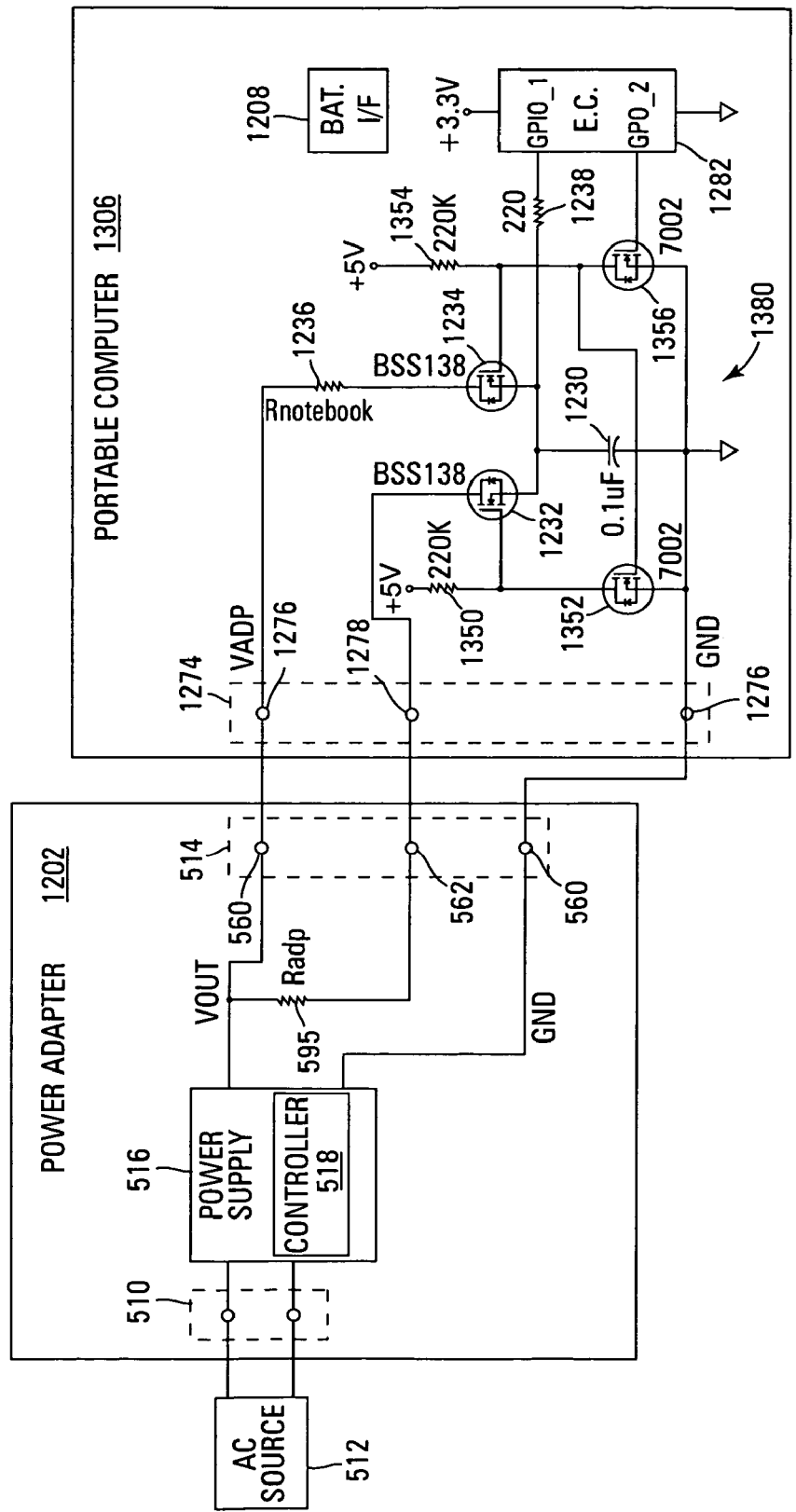
FIG. 13 is a block diagram of one exemplary embodiment of a computing system.

FIG. 13 is a block diagram of one embodiment of a computing system 1300. In the embodiment shown in FIG. 13, the power adapter 1202 of FIG. 12 is coupled to a portable computer 1306 in order to provide power to the portable computer 1306 (and any external devices coupled to the portable computer 1306). Except as described here, the portable computer 1306 is similar to the portable computer 1206 of FIG. 12 and similar components are referenced in FIG. 13 using the same reference numerals used in FIG. 12 for those components. The identification circuit 1380 of the portable computer 1306 is similar to the identification circuit 1280 described above in connection with FIG. 12 except in the manner in which the respective gates of the first and second transistors 1232 and 1234 are controlled. A first gate-bias resistor 1354 and a first gate-control transistor 1356 are coupled in series between a 5 Volt voltage level and ground. The gate of the second transistor 1234 is coupled to a node formed between the first gate-bias resistor 1354 and the first gate-control transistor 1356. The gate of the first gate-control transistor 1356 is coupled to the output terminal GPO_2 of the embedded controller 1282. A second gate-bias resistor 1350 and a second gate-control transistor 1352 are coupled in series between a 5 Volt voltage level and ground. The gate of the first transistor 1232 is coupled to a node formed between the second gate-bias resistor 1350 and the second gate-control transistor 1352. The gate of the second gate-control transistor 1352 is coupled to the gate of the second transistor 1234.

When the embedded controller 1282 outputs a low value on GPO_2, the first gate-control transistor 1356 is turned off, which causes the voltage developed at the gate of the second transistor 1234 to be a high value sufficient to turn on the second transistor 1234. When the second transistor 1234 is turned on, the second gate-control transistor 1352 also turns on, which causes the voltage developed at the gate of the first transistor 1232 to be a low value sufficient to turn off the first transistor 1232. When the embedded controller 1282 outputs a high value on GPO_2, the first gate-control transistor 1356 is turned on, which causes the voltage developed at the gate of the second transistor 1234 to be a low value sufficient to turn off the second transistor 1234. When the second transistor 1234 is turned off, the second gate-control transistor 1352 also turns off, which causes the voltage developed at the gate of the first transistor 1232 to be a high value sufficient to turn on the first transistor 1232. In this way, the resistors 1354 and 1350 and the first and second gate-control transistors 1356 and 1352 are used to replace the first and second inverting amplifiers 1239 and 1240 of FIG. 12. The operation of the identification circuit 1380 and the embedded controller 1282 is otherwise the same as described above in connection with FIG. 12.

Figure 14A:
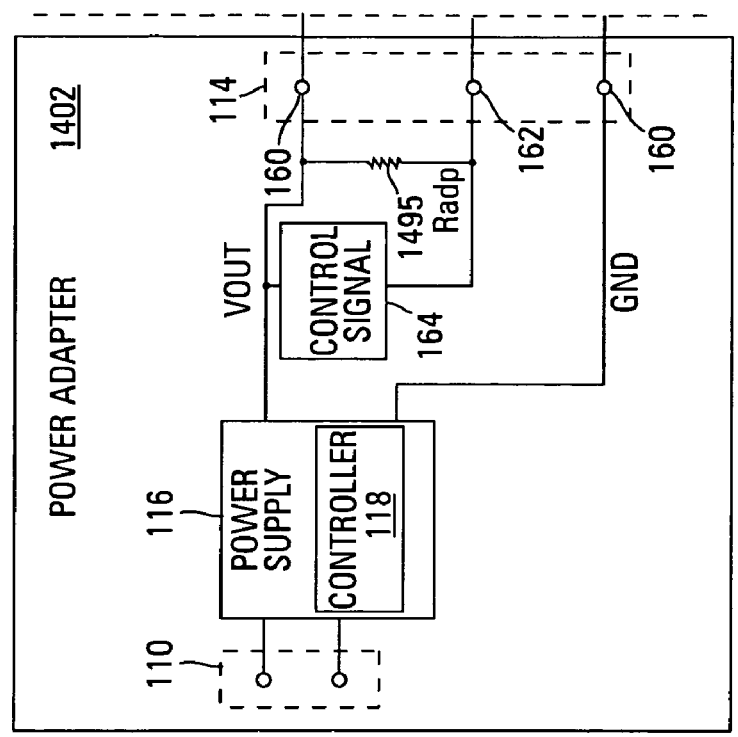
FIGS. 14A and 14B are a block diagram of one exemplary embodiment of a computing system in accordance with the invention.
Figure 14B:
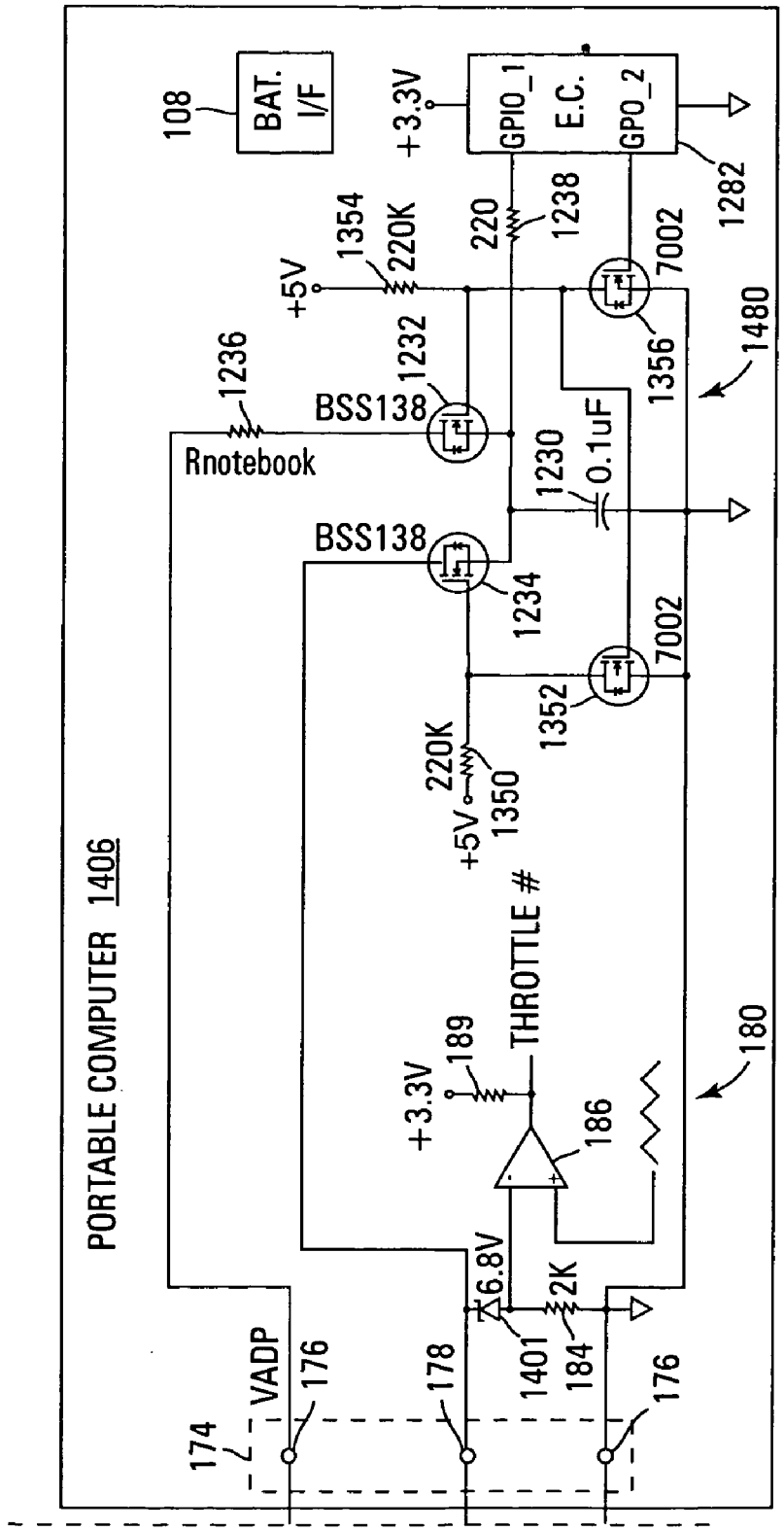

FIG. 14 is a block diagram of one embodiment of a computing system 1400. In the embodiment shown in FIG. 14, a power adapter 1402 is directly coupled to the portable computer 1406 (though in other embodiments, the power adapter 1402 is coupled to the portable computer 1406 via one or more intermediary devices such as a a docking station). Except as described here, the power adapter 1402 and the portable computer 1406 are similar to the power adapter 102 and portable computer 106 of FIG. 1, respectively, and similar components are referenced in FIG. 14 using the same reference numerals used in FIG. 1 for those components. The power adapter 1402 comprises a pull-up resistor 1495 (also referred to here as "resistor Radp" or just "Radp") coupled across VOUT and the control terminal 162 of the adapter interface 114 of the power adapter 1402 in parallel with the control signal circuit 164. The pull-up resistor 1495 of the power adapter 1402, in the embodiment shown in FIG. 14, has a resistance value that is much larger than the resistor 184 used in the throttle signal circuit 180 of the 1406 to couple the control signal 178 to ground. In one implementation of such an embodiment, the resistor 184 has a resistance value of 2 Kiloohms and the pull-up resistor 1495 has a resistance value that is much larger than 2 Kiloohms.

In the embodiment shown in FIG. 14, the portable computer 1406 comprises both the throttle signal circuit 180 and an identification circuit 1480 similar to the identification circuit 1380 of FIG. 13 (and similar components are referenced in FIG. 14 using the same reference numerals used in FIG. 13 for such components). In such an embodiment, the inverting input of the comparator 186 of the throttle signal circuit 180 is coupled to the control terminal 178 of the portable computer 1106 using a Zener diode 1401 having a voltage drop of, for example, 6.8 Volts. Also, in such an embodiment, the sawtooth wave used by the throttle signal circuit 180 has a DC offset (for example, a sawtooth wave having a 1.0 Volt DC offset and a maximum amplitude of 2.0 Volts). When the power adapter 1402 is coupled to the portable computer 1406, at first, the control signal output by the control signal circuit 164 of the power adapter 1402 is zero. Because the pull-up resistor 1495 is much larger than the resistor 184, the current through the pull-up resistor 1495 will be insufficient to generate current on the control terminal 178 sufficient to "turn on" the throttle signal circuit 180. The Zener diode 1401 used to couple the throttle signal circuit 180 to the control terminal 178 of the portable computer 1406 does not affect the identification circuit 1480 since the voltage developed at the control terminal 178 is well less than the Zener voltage of the Zener diode 1401.

In such an embodiment, the output of the identification circuit 1480 is checked by an embedded controller 1482 of the portable computer 1406 when the power adapter 1402 is first coupled to the portable computer 1406. The control signal circuit 164 of the power adapter 1402 typically does not output the control signal during this time because the load current output by the power adapter 1402 typically does not rise above the throttle current threshold during this time or because the response time of the control signal circuit 164 is long enough that the control signal circuit 164 will not react (and output a control signal) during this time. After the embedded controller 1482 of the portable computer 1406 measures Tadp and Tnbk, the embedded controller 1482 need not interact with the identification circuit 1480 again while the same power adapter 1402 is coupled to the portable computer 1406. Thereafter, the amount of power used by the portable computer 1406 is controlled using information indicative of the amount of power output by the power adapter 1402 (that is, using the control signal output by the control signal circuit 164) as described above in connection with FIG. 1.

In other embodiments, the techniques described above in connection with FIGS. 5-14 are used to identify other attributes of a power adapter coupled to a portable computer. More generally, such techniques can be used by a portable computer to identify the power adapter that is currently coupled to the portable computer and the portable computer can use such information to manage the operation of the portable computer (for example, by managing how the portable computer uses power).

What is claimed is:

1. A power adapter comprising:
   a power supply to output power for powering a computer that is separate from the power adapter; and
   an interface to couple the power adapter to the computer;
   wherein the power adapter outputs control information when the computer should reduce an amount of power used thereby, the control information for use by the computer to control the amount of power used by the computer;
   wherein the power adapter outputs the control information when the amount of power output by the power adapter exceeds a threshold value that is less than a maximum associated with the power adapter; and
   wherein the control information comprises information indicative of by how much a load current output by the power supply exceeds the threshold value.

2. The power adapter of claim 1, wherein the control information is communicated to the computer via an intermediary device.

3. A power adapter comprising:
   a power supply to output power for powering a powered device;
   wherein the power adapter outputs control information when the powered device should reduce an amount of power used thereby, the control information for use by the powered device to control the amount of power used by the powered device;
   wherein the power adapter outputs the control information when the amount of power output by the power adapter exceeds a threshold value that is less than a maximum associated with the power adapter; and wherein the control information comprises information indicative of by how much a load current output by the power supply exceeds the threshold value.

4. The power adapter of claim 3, wherein the powered device comprises at least one of a docking station and a computer.

5. The power adapter of claim 3, wherein the control information is output when the amount of load current output by the power supply exceeds a throttle current threshold.

6. A computer comprising:
an interface to receive power from a power adapter that is separate from the computer;
wherein the computer receives control information output by the power adapter when the computer should reduce an amount of power used thereby;
wherein the power adapter outputs the control information when the amount of power output by the power adapter exceeds a threshold value that is less than a maximum associated with the power adapter;
wherein the computer uses the control information to control the amount of power used by the computer; and
wherein the control information comprises information indicative of by how much a load current output by the power supply exceeds the threshold value.

7. The computer of claim 6, wherein the power and the control information are received from the interface.

8. The computer of claim 6, wherein the control information is received from the power adapter.

9. The computer of claim 6, wherein at least one of the power and the control information is received from the power adapter via an intermediary device.

10. The computer of claim 6, wherein the control information is generated by at least one of the power adapter and a docking station.

11. A device comprising:
an interface to receive power from a power adapter;
wherein the device receives control information output by the power adapter when the device should reduce an amount of power used thereby;
wherein the power adapter outputs the control information when the amount of power output by the power adapter exceeds a threshold value that is less than a maximum associated with the power adapter;
wherein the device uses the control information to control the amount of power used by the device;
wherein the control information comprises a control signal that is generated when a load current output by the power adapter exceeds a throttle current threshold; and
wherein the control information comprises information indicative of by how much a load current output by the power supply exceeds the threshold value.

12. The device of claim 11, wherein the device comprises a computer.

13. The device of claim 11, wherein the device reduces the amount of power used by the device when the control signal is received by the device.

14. An intermediary device comprising:
an adapter interface to couple the intermediary device to a power adapter in order to receive power from the power adapter; and
at least one device interface to couple the intermediary device to a powered device;
wherein at least a portion of the power received from the power adapter is applied to the powered device;
wherein the intermediary device receives first control information that is output by the power adapter when the amount of power output by the power adapter exceeds a threshold value that is less than a maximum associated with the power adapter;
wherein the intermediary device communicates to the powered device second control information, wherein the second control information is used by the powered device to control the amount of power used by the powered device; and
wherein the second control information is derived from the first control information.

15. The intermediary device of claim 14, wherein the second control information comprises the first control information, the intermediary device passing through the first information to the powered device without processing the first control information.

16. The intermediary device of claim 14, wherein the intermediary device comprises a docking station.

* * * * *